United States Patent [19]
Frey et al.

[11] Patent Number: 5,763,049
[45] Date of Patent: Jun. 9, 1998

[54] FORMED ULTRA-FLEXIBLE RETROREFLECTIVE CUBE-CORNER COMPOSITE SHEETING WITH TARGET OPTICAL PROPERTIES AND METHOD FOR MAKING SAME

[75] Inventors: Cheryl M. Frey, White Bear Lake; Olester Benson, Jr., Woodbury; Joseph R. Zwack, Roseville; Paul E. Marecki, May Township; Jeanine M. Shusta, Mahtomedi; Matthew R. Atkinson, Cottage Grove, all of Minn.

[73] Assignee: Minnesota Mining and Manufacturing Company, St. Paul, Minn.

[21] Appl. No.: 641,126

[22] Filed: Apr. 30, 1996

[51] Int. Cl.⁶ ............... B32B 3/00; G02B 5/124; B29D 11/00

[52] U.S. Cl. ............... 428/172; 428/142; 428/156; 428/192; 359/530; 264/1.9; 264/214; 156/196; 156/209; 156/212

[58] Field of Search ............... 428/156, 172, 428/142, 141, 192, 207, 166, 913; 359/539, 530, 900; 156/242, 322, 163, 196, 209, 212, 308.4; 264/214, 1.9

[56] References Cited

U.S. PATENT DOCUMENTS

| Re. 29,396 | 9/1977 | Heenan | 204/281 |
|---|---|---|---|
| D. 366,365 | 1/1996 | Hoopman | . |
| 3,010,845 | 11/1961 | Schornstheimer | 117/71 |
| 3,450,459 | 6/1969 | Haggerty | 350/103 |
| 3,469,898 | 9/1969 | Altman | 350/103 |
| 3,541,606 | 11/1970 | Heenan et al. | 350/103 |
| 3,632,695 | 1/1972 | Howell | 264/1 |
| 3,684,348 | 8/1972 | Rowland | 350/103 |
| 3,689,346 | 9/1972 | Rowland | 156/245 |
| 3,692,731 | 9/1972 | McAdow | 260/32.8 R |
| 3,697,070 | 10/1972 | McAdow | 106/291 |

(List continued on next page.)

FOREIGN PATENT DOCUMENTS

| 0 269 329 A2 | 6/1988 | European Pat. Off. | G02B 5/122 |
|---|---|---|---|
| 0 342 958 A2 | 11/1989 | European Pat. Off. | G02B 5/122 |
| 3-124754 | 5/1991 | Japan . | |
| 5-209142 | 8/1993 | Japan . | |
| 1516686 | 7/1978 | United Kingdom . | |
| WO 95/11464 | 4/1995 | WIPO | G02B 5/124 |
| WO 95/11471 | 4/1995 | WIPO | G02B 5/124 |
| WO95/33612 | 12/1995 | WIPO . | |
| WO96/10197 | 4/1996 | WIPO . | |
| WO 96/30786 | 10/1996 | WIPO . | |
| WO 96/36480 | 11/1996 | WIPO | B29D 11/00 |

OTHER PUBLICATIONS

"Exhibit A"–Sealed Retroreflective Sheeting available from Reflexite Corporation of Avon, Connecticut.

"Exhibit B"–High Gloss sealed retroreflective sheeting available from Minnesota Mining and Manufacturing of St. Paul, Minnesota.

"Exhibit C"–Embossed Retroreflective Article manufactured by Nike Corporation on or about Aug. 1995.

Japan Patent Abstract JP-6087169, vol. 018, No. 348, (Jun. 30, 1994).

3M Information Folder 1.1 "Scotchlite™ Heat–Lamp Vacuum Applicator", May 1992, (75–0299–8918–5 PRF 223).

(List continued on next page.)

*Primary Examiner*—Donald Loney
*Attorney, Agent, or Firm*—Karl G. Schwappach; Karl G. Hanson

[57] ABSTRACT

A retroreflective sheeting having a multiplicity of discrete, cube-corner elements cured in situ on a transparent, polymeric overlay film deformed into a three-dimensional structure so that base edges of a plurality of cube-corner elements are non-planar with respect to one another. The retroreflective article preferably has at least one target optical property. The present invention is also directed to a method of deforming the retroreflective sheeting to form a retroreflective article in which the base edges of a plurality of cube-corner elements are non-planar with respect to one another.

42 Claims, 27 Drawing Sheets

U.S. PATENT DOCUMENTS

| | | | |
|---|---|---|---|
| 3,712,706 | 1/1973 | Stamm | 350/103 |
| 3,810,804 | 5/1974 | Rowland | 156/245 |
| 3,811,983 | 5/1974 | Rowland | 156/245 |
| 3,830,682 | 8/1974 | Rowland | 161/2 |
| 3,873,184 | 3/1975 | Heenan | 350/103 |
| 3,923,378 | 12/1975 | Heenan | 350/103 |
| 3,924,929 | 12/1975 | Holmen et al. | 350/103 |
| 3,926,402 | 12/1975 | Heenan | 249/117 |
| 3,935,359 | 1/1976 | Rowland | 428/172 |
| 3,987,229 | 10/1976 | Rairdon et al. | 428/148 |
| 3,988,494 | 10/1976 | McAdow | 428/328 |
| 3,992,080 | 11/1976 | Rowland | 350/103 |
| 4,025,159 | 5/1977 | McGrath | 350/105 |
| 4,066,331 | 1/1978 | Lindner | 350/103 |
| 4,189,209 | 2/1980 | Heasley | 350/103 |
| 4,202,600 | 5/1980 | Burke et al. | 350/103 |
| 4,243,618 | 1/1981 | Van Arnam | 264/1 |
| 4,303,305 | 12/1981 | Jones | 350/103 |
| 4,332,847 | 6/1982 | Rowland | 428/156 |
| 4,349,598 | 9/1982 | White | 428/161 |
| 4,486,363 | 12/1984 | Pricone et al. | 264/1.4 |
| 4,576,850 | 3/1986 | Martens | 428/156 |
| 4,588,258 | 5/1986 | Hoopman | 350/103 |
| 4,601,861 | 7/1986 | Pricone et al. | 264/1.6 |
| 4,668,558 | 5/1987 | Barber | 428/156 |
| 4,712,868 | 12/1987 | Tung et al. | 350/105 |
| 4,775,219 | 10/1988 | Appeldorn et al. | 350/103 |
| 4,801,183 | 1/1989 | Martin | 350/103 |
| 4,801,193 | 1/1989 | Martin | 350/103 |
| 4,895,428 | 1/1990 | Nelson et al. | 350/103 |
| 4,938,563 | 7/1990 | Nelson et al. | 350/103 |
| 5,084,782 | 1/1992 | Taylor | 359/515 |
| 5,138,488 | 8/1992 | Szczech | 359/529 |
| 5,152,917 | 10/1992 | Pieper et al. | 51/295 |
| 5,202,180 | 4/1993 | Watts | 428/324 |
| 5,213,872 | 5/1993 | Pricone et al. | 428/195 |
| 5,272,562 | 12/1993 | Coderre | 359/529 |
| 5,276,075 | 1/1994 | Santini | 524/40 |
| 5,362,374 | 11/1994 | Chang | 205/164 |
| 5,387,458 | 2/1995 | Pavelka et al. | 428/141 |
| 5,435,816 | 7/1995 | Spurgeon et al. | 51/295 |
| 5,450,235 | 9/1995 | Smith et al. | 359/529 |
| 5,454,844 | 10/1995 | Hibbard et al. | 51/295 |
| 5,470,058 | 11/1995 | Sullivan et al. | 273/65 B |
| 5,485,311 | 1/1996 | McAllister | 156/60 |
| 5,491,586 | 2/1996 | Phillips | 359/530 |
| 5,592,330 | 1/1997 | Bernard | 359/529 |

OTHER PUBLICATIONS

3M Information Folder 1.2 "Application of Scotchlite™ Reflective Sheeting High Intensity Grade", Aug. 1992, (75-0299-8919-3).

"Standard Test Method for Computing the colors of Objects by Using the CIE System", ASTM Designation: E308-90, 233-240 (Feb. 1991).

"Standard Test Method for Reflectance Factor and color b Spectrophotometry Using Bidriectional Geometry", ASTM Designation E1349-90, 377-378 (May 1990).

"Standard Test Methods for Tensile Properties of Thin Plastic Sheeting", ASTM Designation D882-75B, 359-365 (Jan. 1976).

Sneddon, "The Relation Between Load and Penetration in the Axisymmetric Boussinesq Problem for a Punch of Arbitrary Profile", *Int. J. Eng. Sci.*, 3, 47-57 (1965).

FORMED ULTRA-FLEXIBLE RETROREFLECTIVE CUBE-CORNER COMPOSITE SHEETING WITH TARGET OPTICAL PROPERTIES AND METHOD FOR MAKING SAME

FIELD OF INVENTION

The present invention relates to a flexible, retroreflective sheeting deformed to produce target optical properties and to a process of deforming a retroreflective sheeting into a three-dimensional article with such optical properties.

BACKGROUND OF THE INVENTION

Cube-corner retroreflectors typically comprise a sheeting having a generally planar front surface and an array of cube-corner elements protruding from the back surface. Cube-corner reflecting elements comprise generally trihedral structures that have three approximately mutually perpendicular lateral faces meeting in a single corner, i.e., cube-corner. Light incident to the front surface enters the sheet, passes through the body of the sheet to be internally reflected by the faces of the elements so as to exit the front surface in a direction substantially toward the light source. The light rays are typically reflected at the cube faces due to either total internal reflection ("T.I.R."), or reflective coatings such as a vapor-deposited aluminum film. Use of metallized aluminum coating on the cube-corner elements tends to produce a gray coloration to an observer in ambient light or daylight conditions, and is thus considered aesthetically undesirable for some applications.

A very common retroreflective sheeting uses an array of cube-corner elements to retroreflect light. FIGS. 1 and 2 illustrate an example of such a retroreflective sheeting, noted generally by numeral 10. The array of cube-corner elements 12 project from a first or rear side of a body portion 14 that includes a body layer 18 (also referred to in the art as an overlay) and may also include a land layer 16. Light illustrated as arrows 23 enters the cube-corner sheeting 10 through the front surface 21; it then passes through the body portion 14 and strikes the planar faces 22 of the cube-corner elements 12 to return in the direction from which it came.

FIG. 2 shows the back side of the cube-corner elements 12, where each cube-corner element 12 is in the shape of a trihedral prism that has three exposed planar faces 22. The cube-corner elements 12 in known arrays are typically defined by three sets of parallel v-shaped grooves 25, 26, and 27. Adjacent planar faces 22 on adjacent cube-corner elements 12 in each groove form an external dihedral angle (a dihedral angle is the angle formed by two intersecting planes). This external dihedral angle is constant along each groove in the array. This has been the case for the variety of previously produced cube-corner arrays.

The planar faces 22 that define each individual cube-corner element 12 generally are substantially perpendicular to one another, as in the corner of a room. The internal dihedral angle—that is, the angle between the faces 22 on each individual cube-corner element in the array—typically is 90°. This internal angle, however, can deviate slightly from 90° as is well known in the art; see for example, U.S. Pat. No. 4,775,219 to Appeldorn et al. Although the apex 24 of each cube-corner element 12 may be vertically aligned with the center of its base (see, for example, U.S. Pat. No. 3,684,348) the apex also may be offset or canted from the base center as disclosed in U.S. Pat. No. 4,588,258 to Hoopman. Other cube-corner configurations are disclosed in U.S. Pat. Nos. 5,138,488, 4,066,331, 3,923,378, 3,541,606, and Re 29,396, 3,712,706 (Stamm), 4,025,159 (McGrath), 4,202,600 (Burke et al.), 4,243,618 (Van Arnam), 4,349,598 (White), 4,576,850 (Martens), 4,588,258 (Hoopman), 4,775,219 (Appeldorn et al.), and 4,895,428 (Nelson et al.).

Where the cube-corner retroreflective sheeting is likely to be used in an environment where it could be exposed to moisture or other elements, e.g., outdoors or in high humidity, it may be preferred that cube-corner elements are encapsulated with a conformable sealing film. The aforementioned U.S. Pat. No. 4,025,159 discloses encapsulation of cube-corner elements using a sealing film.

Basic cube-corner elements have a low angularity such that the element will only brightly retroreflect light that impinges on it within a narrow angular range centering approximately on its optical axis. The optical axis is the trisector of the internal space defined by the faces of the element. Impinging light that is inclined substantially away from the optical axis of the element strikes a face at an angle less than its critical angles, thereby passing through the face rather than being reflected.

FIG. 3 is a graph in polar coordinates of the optical profile of a basic cube-corner retroreflective sheet, having six maxima and six minima at 30° azimuthal intervals. The intensity of the retroreflective beam from a cube-corner retroreflective sheeting is greatest when the incident beam has an angle of incidence of 0° (normal to the plane of the sheeting). At higher angles of incidence (approximately greater than 30°) the brightness of the retroreflected beam is a function of the angle about an axis normal to the sheet called the azimuthal angle. When the angle of incidence of a light beam is held constant at a value of, for example 60° from normal, and the azimuthal angle of the incident beam is varied from 0° to 360°, the intensity of the retroreflected beam varies as illustrated in FIG. 3.

There are a number of applications for cube-corner retroreflective sheeting with non-standard or customized optical profiles. For example, more uniform retroreflectivity or wider retroreflective angularity than shown in FIG. 3 is often required. For some applications it may be desirable to limit retroreflectivity to a narrow band of angularity and/or along a specific segment of the azimuthal angle.

One method of changing the optical profile of cube-corner elements is to cut the master or mold formed thereon into pieces and reassembling the pieces in a pattern that produces differing zones of orientation on the retroreflective sheeting. For example, an optical profile with wide retroreflective angularity in multiple viewing planes can be achieved by rotating adjacent pieces of the mold or master 30° or 90° about an axis normal to the plane of the elements (rotating the pieces 60° or any multiple thereof effects no net change in orientation of the cube-corner elements). Reassembling the pieces of the mold or master with the necessary precision, however, is time consuming and expensive. A method of reassembling a master mold is disclosed in U.S. patent application Ser. No. 08/587,719 filed Jan. 19, 1996.

Another method of changing the optical profile of cube-corner elements is to tilt or cant the optical axes of cube-corner elements with respect to one another. FIG. 4 illustrates a cube-corner element 30 with three mutually perpendicular faces 31a, 31b, and 31c that meet at the cube's apex 34. The cube's base edges 35 are generally linear and generally lie in a single plane that defines the base plane 36 of the element 30. Cube-corner element 30 also has a central or optical axis 37, which is the trisector of the internal angles defined by lateral faces 31a, 31b, and 31c. The optical axis may be disposed perpendicular to base plane 36, or it may be canted as described in U.S. Pat. No. 4,588,258 to Hoopman and U.S. Pat. No. 5,138,488 to Szczech. The cost of creating tooling necessary to practice the invention of Hoopman is relatively high. Moreover, this technique does not lend itself to rapid prototyping of customized optical profiles or angularity.

Therefore, what is needed is a method of creating retroreflective articles with prototype or target optical properties without the need for expensive tooling.

SUMMARY OF INVENTION

The present invention relates to a flexible, retroreflective sheeting deformed to produce target optical properties. The present invention is also directed to a process of deforming a retroreflective sheeting into a three-dimensional article having such optical properties.

The retroreflective sheeting includes a multiplicity of discrete, cube-corner elements cured in situ on a transparent, polymeric overlay film. The retroreflective sheeting is deformed into a three-dimensional structure so that base edges of a plurality of cube-corner elements are non-planar with respect to one another to produce at least one target optical property. The target optical properties may be a desired optical profile, angularity, three-dimensional appearance, whiteness, glitter-effect, or combinations thereof The retroreflective sheeting is preferably a single, unitary sheet.

The base edges of a plurality of adjacent cube-corner elements may be non-planar or tilted with respect to one another. The base edges of one or more cube-corner elements are preferably not parallel to a front surface of the overlay film. The cube-corner elements may have a variable density across a portion of the retroreflective article. Adjacent cube-corner elements across a portion of the retroreflective article may have a variable spacing. The overlay film may have a thickness that varies across a portion of the retroreflective article.

The present retroreflective article may be used as a master to produce tooling for forming additional retroreflective articles.

The three-dimensional structure may have one or more embossed symbols. The retroreflective sheeting may optionally include a specular reflector coated on the cube-corner elements. The retroreflective sheeting may optionally include a sealing film extending substantially across the cube-corner elements opposite the overlay film. Metallized cube-corner elements may optionally be backfilled with a coating, such as a polymeric material, resin or adhesive. In one embodiment, the coating may be applied uniformly or in a pattern, such as printing symbols in one or more colors.

The polymeric overlay film preferably has a first elastic modulus and the cube-corner elements preferably have a second elastic modulus greater than the first elastic modulus. The cube-corner elements preferably are constructed from a thermoset polymer. The polymeric overlay film is preferably constructed from a thermoformable polymer. The overlay film may be selected from the group consisting of the following: ionomeric ethylene copolymers, plasticized vinyl halide polymers, acid-functional ethylene copolymers, aliphatic polyurethanes, aromatic polyurethanes, other light transmissive elastomers, and combinations thereof The cube-corner elements may be selected from the group consisting of monofunctional, difunctional, and polyfunctional acrylates or combinations thereof.

The present invention is also directed to a method of forming a retroreflective article having at least one target optical property. A cube-corner retroreflective sheeting is prepared having a multiplicity of discrete, cube-corner elements cured in situ on a transparent, polymeric overlay film. The flexible retroreflective sheeting is deformed into a three-dimensional configuration so that the base edges of a plurality of cube-corner elements are non-planar with respect to one another.

The step of deforming may include tilting the base edges of the plurality of adjacent cube-corner elements with respect to one another. The step of deforming is preferably selected from the group consisting of thermo-forming, vacuum-forming, embossing, and combinations thereof The step of deforming may include forming a three-dimensional symbol in the retroreflective sheeting, altering the density and/or spacing of at least a portion of the cube-corner elements, or stretching the retroreflective sheeting in at least one direction. The step of stretching may include uniformly (or non-uniformly) stretching or biaxially stretching the retroreflective sheeting. The step of deforming may include altering the base edges of one or more cube-corner elements so that they are not parallel to a front surface of the overlay film.

The cube-corner elements may optionally be coated with a spectral reflector. A sealing film may optionally be bonded substantially across an exposed surface of the cube-corner elements either before or after the step of deforming the retroreflective sheeting.

In an alternate embodiment, a mold is formed from the cube-corner elements of the deformed retroreflective article. A polymeric material is applied to the mold and the polymeric material is at least partially cured. The polymeric material is then removed from the mold so that a second retroreflective article is produced.

As used herein:

Deforming refers to thermo-forming, vacuum-forming, embossing, molding, stamping, elastic or inelastic stretching, uniformly or non-uniformly stretching, or combinations thereof.

Symbol refers to any alphanumeric character, logo, seal, geometric pattern or combinations thereof.

Target Optical Properties refers to a desired optical profile, angularity, three-dimensional appearance, whiteness, glitter-effect, or combinations thereof.

BRIEF DESCRIPTION OF DRAWING

The invention is further explained with reference to the drawing, wherein.

DETAILED DESCRIPTION OF PREFERRED EMBODIMENTS

The present invention relates to a retroreflective article formed from a flexible, retroreflective sheeting to produce target optical properties and to a process of deforming a retroreflective sheeting into a three-dimensional article. The retroreflective sheeting has a multiplicity of discrete, cube-corner elements cured in situ on a transparent, polymeric overlay film. The retroreflective sheeting is deformed into a three-dimensional structure so that the base edges of a plurality of cube-corner elements are non-planar with respect to one another.

The retroreflective article of the present invention has the ability to reflect substantial quantities of incident light back towards the light source while exhibiting target optical properties. The present retroreflective article is suitable for being incorporated into a variety of products, such as clothing, shoes, license plates, signs, vehicle markings, cone sleeves and barrel wraps.

Methods of making a glittering retroreflective articles are disclosed in the following related applications filed on the same day herewith: "Method of Making Glittering Retroreflective Sheeting", Ser. No. 08/641,129; "Mold for Producing Glittering Cube-Corner Retroreflective Sheeting", Ser. No. 08/640,383; and "Glittering Cube-Corner Retroreflective Sheeting", Ser. No. 08/640,326.

Figure 4:
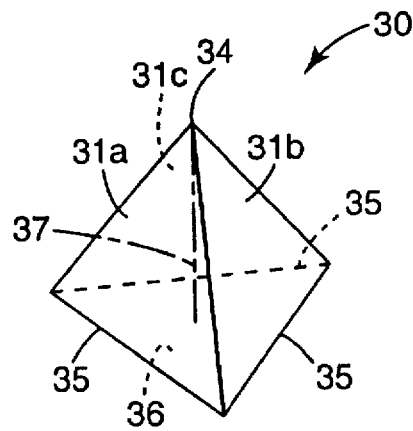
FIG. 4 is an isometric view of a cube-corner element that may be used in a retroreflective sheeting of the invention.
Figure 5:
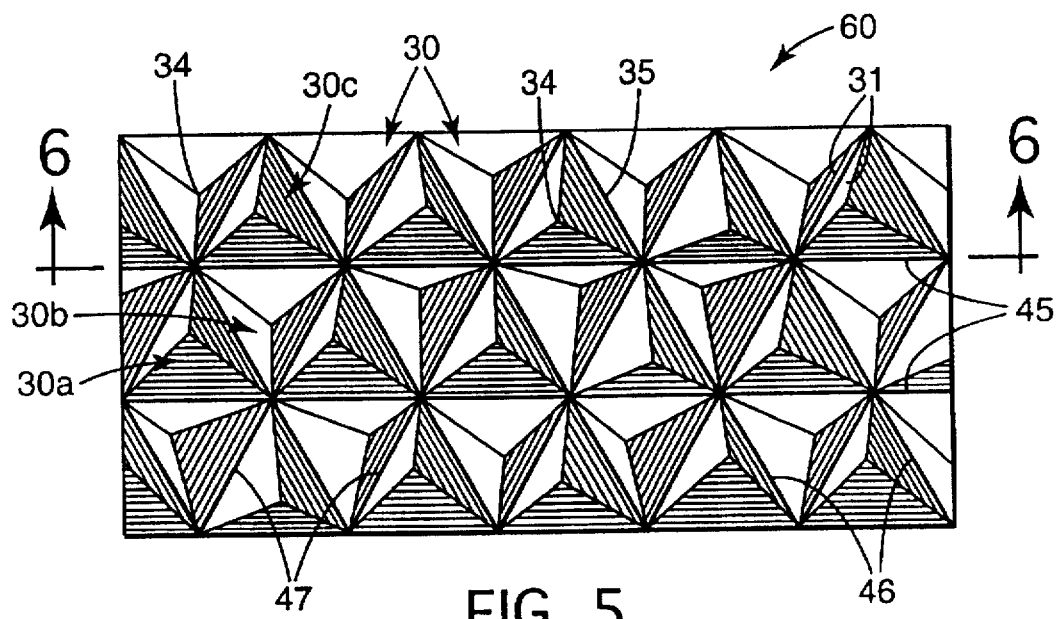
FIG. 5 is a bottom view of a retroreflective article according to the present invention.

FIG. 5 shows the backside of a unitary cube-corner sheeting 60 that has been deformed to produce at least one target optical property. Cube-corner elements 30 are similar to those depicted in FIG. 4. Each cube-corner element 30 meets, but is not necessarily connected to, an adjacent cube-corner element at a base edge 35. The array includes three sets of parallel grooves 45, 46, and 47. The external dihedral angles (designated as a in FIG. 6) between faces 31 of adjacent cube-corner elements 30 vary along the grooves 45–47 in the array. The base edges 35 of the cube-corner elements in the array are nonplanar. Consequently, the apex 34 of one cube, such as cube 30a may be relatively close to another apex such as cube 30b, but the apex of cube 30b may then be further away from another adjacent apex such as the apex of cube 30c.

Figure 6:
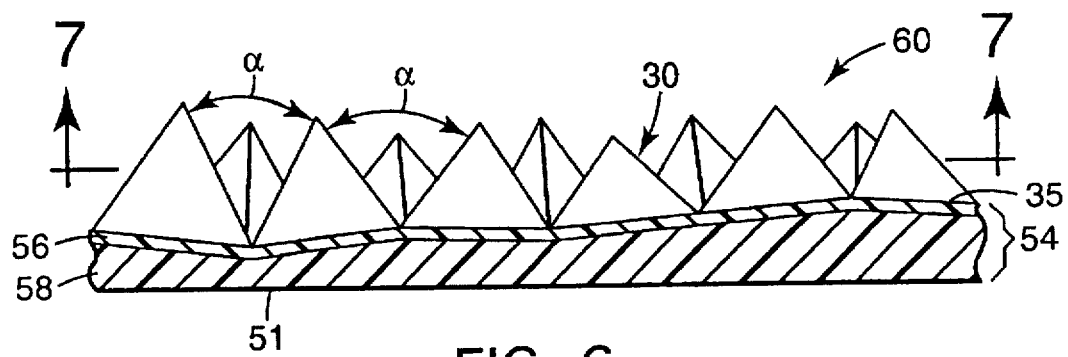
FIG. 6 is a sectional view of a retroreflective article taken along lines 6—6 of FIG. 5.

FIG. 6 is an exemplary illustration of distances the base edges 35 are offset or tilted with respect to one another, or with respect to the front surface 51. For cube-corner elements that are about 50 to 200 micrometers high, the variation in height between adjacent base edges typically is about 0 to 50 micrometers. It will be understood that the present retroreflective article may be deformed on a micro or macro level. As will be discussed in the Examples, the retroreflective sheeting may be deformed over coated abrasive paper containing abrasive grains with diameters of about 100 to 550 micrometers. Abrasive grains of this size have radii of curvatures of about 50 to 225 micrometers. The retroreflective sheeting may be deformed over smaller structures, in the range of about 10 to 50 micrometers, although the change in the optical properties may be minimal. It is believed that the change in the optical properties of the retroreflective sheeting when deformed over micro structures in the range of about 250 to 10 microns is a function of the size of the cube-corner elements and the thickness of the overlay film. For example, smaller cube-corner elements and/or a thinner overlay film may be more susceptible to deformation over micro structures within this range.

FIG. 6 is a sectional view of the cube-corner sheeting 60 of FIG. 5 showing the position of one cube apex relative to another. Additionally, FIG. 5 shows tilting or canting of the base edges 35 relative to one another and relative to front surface 51. The base edge 35 of one cube may be disposed closer to or further away from the front surface 51 of overlay film 58 than the base edges of other adjacent cube-corner elements due to deformation of the overlay film 58. If the unitary cube-corner sheeting 60 possesses a land layer 56, it is also not uniformly spaced from the front surface 51. The cube-corner sheeting 60 preferably does not have a land area 56, such that each cube-corner element 30 is a discrete entity. When the cube-corner elements are tilted, the base edges 35 of many of the cube-corner elements 30 do not reside in the same plane as the front surface 51. Additionally, the edges 35 of one or more cube-corner elements 30 are not parallel to the front surface 51. Either surface of the overlay film 58 may optionally contain symbols printed on or formed therein.

FIG. 6 also shows the external dihedral angle, α, that defines the angle between faces 31 of adjacent cube-corner elements 30. Angle α may vary along all grooves in a single parallel groove set, it may vary along all grooves in two parallel groove sets, or it may vary along grooves in all three groove sets in the array. In an array of randomly tilted cube-corner elements, angle α varies randomly amongst adjacent faces of adjacent cube-corner elements throughout essentially the whole array.

The overlay film 58 in body portion 54 typically has an average thickness of approximately 20 to 1200 micrometers, and preferably is about 50 to 400 micrometers. The cube-corner elements typically have an average height of about 20 to 500 micrometers, more typically of about 25 to 200 micrometers. The optional land layer 56 preferably is kept to a minimal thickness of 0 to 150 micrometers, and is preferably as close to zero as possible so that the strain generated during deformation does not propagate laterally through the land area. A coating may optionally be applied to the exposed metallized cube-corner elements 30 to provide the deformations of the retroreflective article 60 with additional structural support. For some applications, it may be desirable for the retroreflective article to be a free-standing, self-supporting structure. In one embodiment, the coating is a polymeric material, resin or an adhesive. The coating may optionally contain a pigment or dye of one or more colors. Additionally, the coating may be applied uniformly or in a pattern containing symbols using a variety of printing techniques. Metallized retroreflective sheeting generally maintains higher brightness after deformation because T.I.R. tends to break down in the unsealed sheeting.

Figure 7:
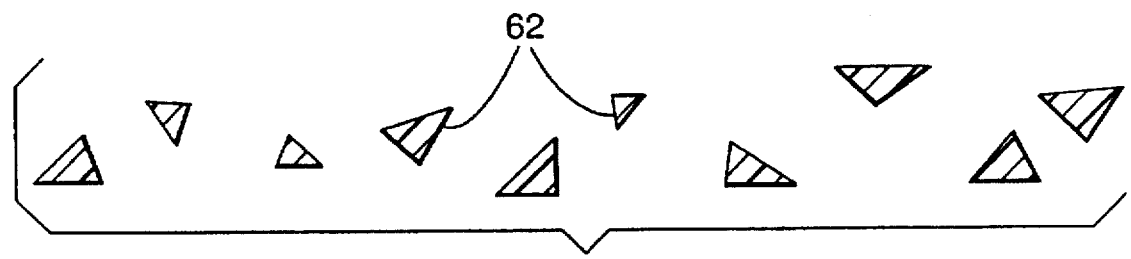
FIG. 7 is a sectional view of the retroreflective article taken along lines 7—7 of FIG. 6.

FIG. 7 shows cube-corner elements intersected by a plane that is parallel to the front surface 51. As illustrated, the plane does not intersect each cube to produce a triangle 62 of the same cross-sectional area. One cube may be tilted or offset from the front surface 51 to such an extent that the intersecting plane only passes through a tip of the cube, resulting in a small triangular cross-section—whereas, a cube that stands upright may be intersected such that the triangle resulting from the cross-section is relatively large. Thus, even though the cube-corner elements in the array may be of similar size, they can produce triangles of random sizes when intersected as described because of the manner in which the cubes are tilted or offset with respect to a reference plane. It will be understood that the spacing between the cube-corner elements 30 can vary, as will be discussed below, although retroreflectivity tends to decrease as spacing increases.

Figure 8:
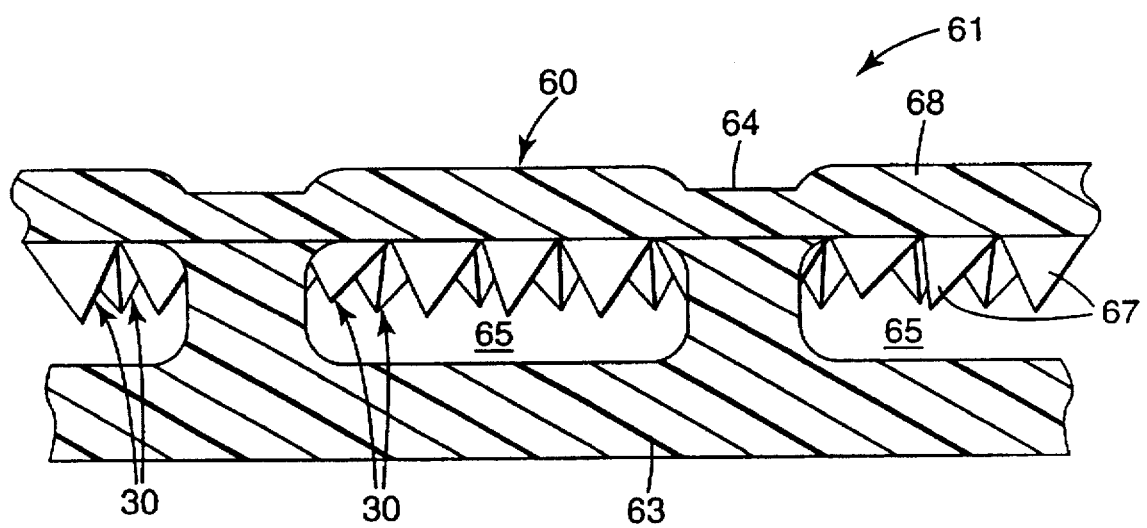
FIG. 8 is a sectional view of a retroreflective article having a seal film secured to the backside of the retroreflective sheeting.

FIG. 8 shows a retroreflective article 61 that has a seal film 63 disposed over the backside of cube-corner elements 30, such as is disclosed in U.S. Pat. No. 4,025,159. The seal film 63 is bonded to the body portion of the sheeting through the cube-corner elements 30 by a plurality of seal lines 64. The bonding pattern produces a plurality of hermetically sealed chambers 65 that prevent moisture and dirt from contacting the backside of the cube-corner elements. Chambers 65 enable the cube-air interface to be maintained to prevent loss of retroreflectivity. The cube-corner elements 30 may optionally be coated with a reflective material on the surface 67, such as vapor depositing or chemically depositing a metal such as aluminum, silver, nickel, tin, copper, or dielectric materials as are known in the art of cube-corner retroreflective articles. It will be understood that the retroreflective sheeting 61 will typically have a metal layer on the surface 67 or a seal film 63, but not both.

Although the glittering effect typically would not be noticeable, or significantly noticeable, within each seal line because the cube-corner elements typically become engulfed in the seal line, the glittering effect is very noticeable "substantially beyond" the seal line(s). That is, the glittering effect may be noticed at a distance beyond where heat and/or pressure from the sealing operation would affect the cube-corner elements in the array. Typically, a sealing operation that used heat and/or pressure would not affect the cube-corner elements at a distance greater than two millimeters (mm), and more typically at 5 mm or more from a seal line.

Preferably, the sealing layer comprises a thermoplastic material with a similar low elastic modulus as the overlay film 68. Illustrative examples include ionomeric ethylene copolymers, plasticized vinyl halide polymers, acid functional polyethylene copolymers, aliphatic polyurethanes, aromatic polyurethanes, and combinations thereof In certain applications, the optional sealing layer 63 can provide significant protection for the cube-corner elements of the composite material from environmental effects, as well as maintaining a sealed air layer around the cube-corner elements which is essential for creating the refractive index differential needed for total internal reflection. As a result of the decoupling of cube-corner elements 30, the sealing layer 63 may optionally be adhered, at least in part, directly to the overlay film 68 between independent cube-corner elements.

The seal film may be bonded to the cube-corner elements in the body portion of the sheeting using known techniques; see for example, U.S. Pat. No. 4,025,159. Sealing technique examples include radio frequency welding, thermal fusion, conductive heat sealing, ultrasonic welding, and reactive welding. When applying a seal film to the backside of a retroreflective sheeting, considerable attention must be paid to the composition and physical properties of the seal film. The seal film must be able to securely bond to the backside of the cube-corner sheeting and should not contain components that could adversely affect retroreflectivity or the appearance of the retroreflective product. For example, the seal film should not contain components that could leach out (e.g., dyes) and contact the backside of the cube-corner elements. The sealing film typically comprises a thermoplastic material because such materials lend themselves well to fusing through relatively simple and commonly available thermo-bonding techniques.

Figure 9:
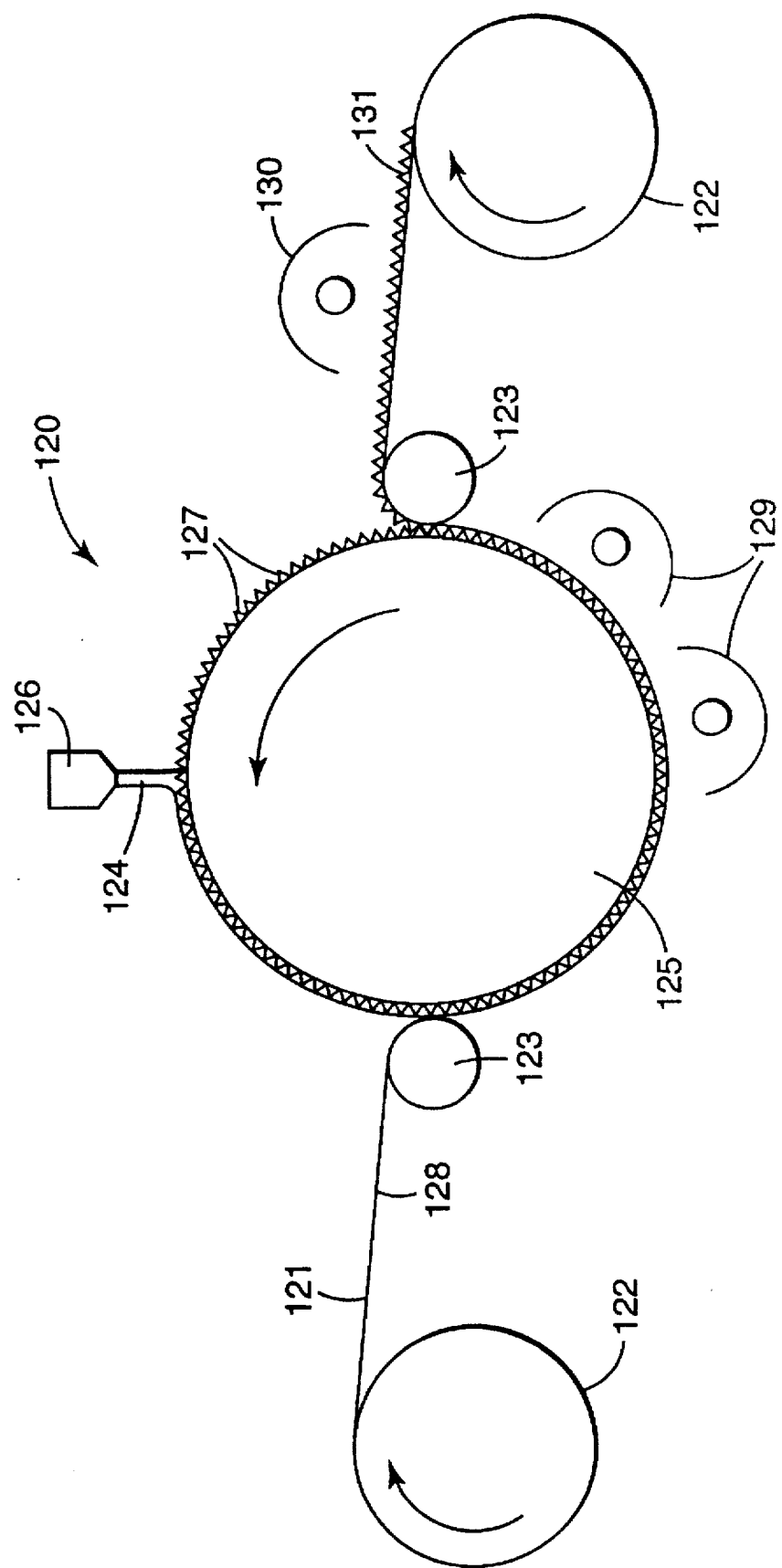
FIG. 9 is a schematic illustration of a method for preparing a retroreflective sheeting.

FIG. 9 is a schematic illustration of an apparatus 120 for casting and curing retroreflective sheeting suitable for use in the present invention. Overlay film 121 is drawn along guiding roller 122 or from a stock roll of material to nip roller 123, e.g., a rubber coated roller, where overlay film 121 contacts suitable resin formulations 124 previously applied to patterned tool roll 125 through coating die 126. The excess resin extending above the cube-corner element forming cavities 127 of tool 125 is minimized by setting nip roller 123 to a gap setting that is effectively less than the height of the cube-corner forming elements of tool 125. It will be understood that the gap setting may be achieved by applying pressure to the nip roller 123. In this fashion, mechanical forces at the interface between nip roller 123 and tool 125 insure that a minimum amount of resin 124 extends above cavities 127 of tool 125. Depending on the flexibility of overlay film 121, film 121 may be optionally supported with suitable carrier film 128 that provides structural and mechanical durability to overlay film 121 during casting and curing. The carrier film 128 may be stripped from overlay film 121 after the sheeting is removed from tool 125 or left intact for further processing of the retroreflective sheeting. Use of such a carrier film is particularly preferred for low modulus overlay films.

The resin composition that forms the retroreflective array of cube-corner elements can be cured in one or more steps. Radiation sources 129 expose the resin to actinic radiation, e.g., ultraviolet light, visible light, etc. depending upon the nature of the resin in a primary curing step through the overlay film. As can be appreciated by one of skill in the art, the selected overlay film need not be completely or 100 percent transparent to all possible wavelengths of actinic radiation that may be used in curing the resin. Alternatively, curing can be performed by irradiation through a transparent tool 125, such as disclosed in U.S. Pat. No. 5,435,816.

The tool 125 has a molding surface having a plurality of cavities opening thereon which have the shape and size suitable for forming desired cube-corner elements. The cavities, and thus resultant cube-corner elements, may be three sided pyramids having one cube-corner each, e.g., such as are disclosed in the U.S. Pat. No. 4,588,258, may have a rectangular base with two rectangular sides and two triangular sides such that each element has two cube-corners each, e.g., such as are disclosed in U.S. Pat. No. 4,938,563 Nelson et al.), or may be of other desired shape, having at least one cube-corner each, e.g., such as are disclosed in U.S. Pat. No. 4,895,428 (Nelson et al.). It will be understood by those skilled in the art that any cube-corner element may be used in accordance with the present invention.

The tool 125 should be such that the cavities will not deform undesirably during fabrication of the composite article, and such that the array of cube-corner elements can be separated therefrom after curing. Materials useful in forming tooling 125 preferably machine cleanly without burr formation, exhibit low ductility and low graininess, and maintain dimensional accuracy after groove formation. The tool can be made from polymeric, metallic, composite, or ceramic materials. In some embodiments, curing of the resin will be performed by applying radiation through the tool. In such instances, the tool should be sufficiently transparent to permit irradiation of the resin therethrough. Illustrative examples of materials from which tools for such embodiments can be made to include polyolefins and polycarbonates. Metal tools are typically preferred, however, as they can be formed in desired shapes and provide excellent optical surfaces to maximize retroreflective performance of a given cube-corner element configuration.

The primary curing can completely or partially cure the cube-corner elements. A second radiation source 130 can be provided to cure the resin after sheeting 131 has been removed from tool 125. The extent of the second curing step is dependent on a number of variables, among them the rate of feed-through of the materials, composition of the resin, nature of the crosslinking initiators used in the resin formulation, and the geometry of the tool. Illustrative examples include electron beam exposure and actinic radiation, e.g., ultraviolet radiation, visible light radiation, and infrared radiation.

Removal of the retroreflective sheeting 131 from the tooling 125 typically generates sufficient mechanical stresses to fracture the minimal land area between the cube-corner elements, if any, that exists between the individual cube-corner elements of the sheeting. The decoupled, independent nature of the discrete cube-corner elements and strong bond of each independent element to the overlay film gives the retroreflective sheeting substantial flexibility, while retaining high levels of retroreflective performance after undergoing mechanical deformation stresses.

Heat treatment of the sheeting 131 may optionally be performed after it is removed from the tool. Heating serves to relax stresses that might have developed in the overlay film or cube-corner elements, and to drive off unreacted moieties and reaction by-products. Typically, such treatment involves heating the sheeting to an elevated temperature, e.g., above the glass transition temperature of the subject resin. Typically a sheeting will exhibit an increase in retroreflective brightness after such treatment.

Figure 10:
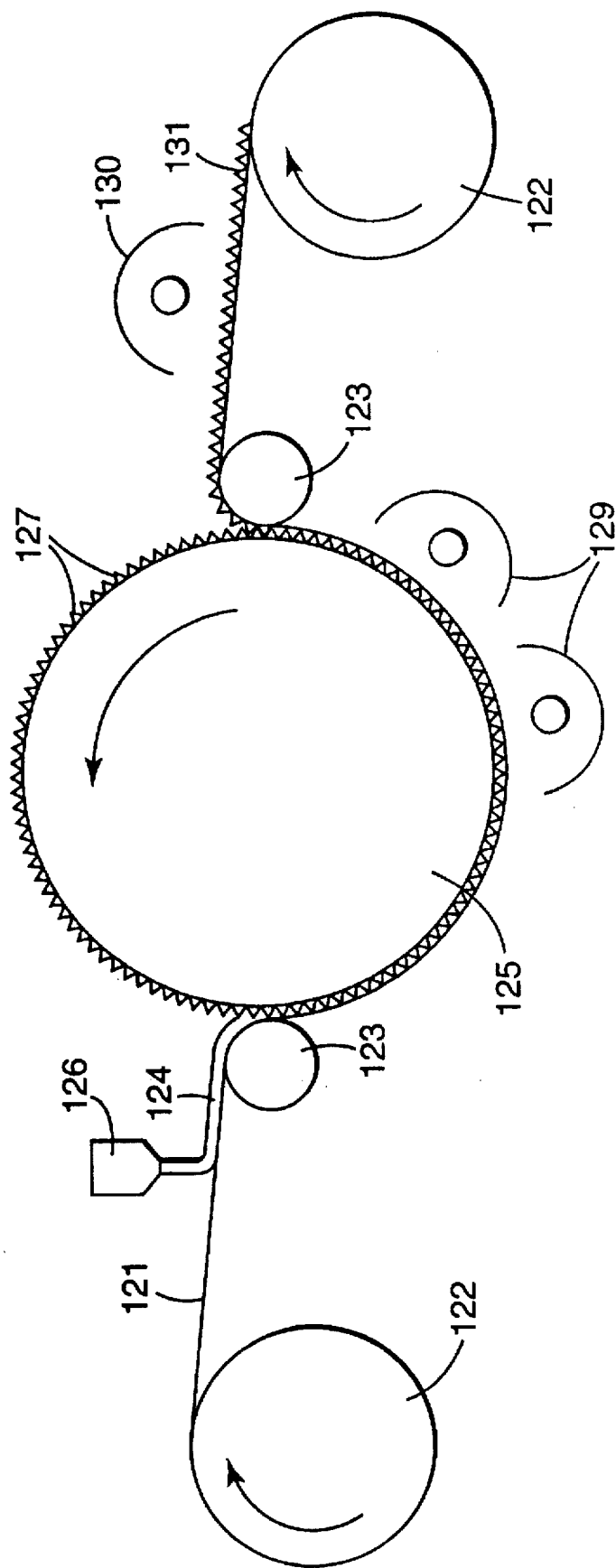
FIG. 10 is a schematic illustration of an alternate method for preparing a retroreflective sheeting.

FIG. 10 illustrates an alternate apparatus for casting and curing retroreflective sheeting suitable for making the present retroreflective article. Resin composition 124 is cast directly onto overlay film 121. The resin-film combination is then contacted with patterned tool roll 125 with pressure being applied through appropriate setting of nip roller 123. As in the configuration illustrated in FIG. 9, nip roller 123 serves to minimize the amount of resin extending above the cube-corner forming cavities 127 of tool 125. The resin can be cured by exposure to actinic radiation from a first radiation source 129, and optional second radiation source 130. The actinic radiation from first radiation source 129 must first pass through overlay film of the sheeting before impinging on the resin.

The individual or discrete cube-corner elements are essentially totally decoupled from each other, providing the ultra-flexible character of the composite retroreflective sheeting. The decoupled cube-corner elements are no longer mechanically constrained by the effect of any land area, minimizing the mechanical stresses that might tend to deform them and lead to degradation of retroreflective performance. The discrete cube-corner elements of retroreflective sheeting retain a high degree of retroreflective brightness after being deformed.

Retroreflective sheeting prepared according to the above method exhibits a retroreflective brightness, i.e., a coefficient of retroreflection, of greater than about 50, preferably greater than about 250, and more preferably greater than about 500, candela/lux/square meter, measured at an entrance angle of $-4°$ and an observation angle of $-0.2°$, when the sheeting is in a planar, non-deformed configuration. By planar it is meant that the sheeting is permitted to lay flat and by non-deformed it is meant that the sheeting has not been mechanically stressed after decoupling of the cube-corner elements.

The resin composition and overlay film are preferably such that when the resin composition contacts the overlay film it penetrates the overlay film so that after the primary curing treatment an interpenetrating network between the material of the cube-corner elements and the material of the overlay film is formed such as disclosed in U.S. patent application Ser. No. 08/472,444 filed Jun. 7, 1995. The array of cube-corner elements preferably comprises a material that is thermoset or extensively crosslinked, and the overlay film preferably comprises a thermoplastic material. The superior chemical and mechanical properties of thermoset materials yield cube-corner elements optimally capable of maintaining desired retroreflectivity.

A critical criterion in the selection of these components is the relative elastic modulus for each component. The term "elastic modulus" as used herein means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 one inch/minute) rate of grip separation.

Alternatively, elastic modulus may be determined according to standardized test ASTM D882-75b using Static Weighing Method A with a five inch initial grip separation, a one inch sample width, and an inch per minute rate of grip separator. Under some circumstances, the polymer may be so hard and brittle that it is difficult to use this test to ascertain the modulus value precisely (although it would be readily known that it is greater than a certain value). If the ASTM method is not very suitable, another test, known as the "Nanoindentation Technique" may be employed. This test may be carried out using a microindentation device such as a UMIS 2000 available from CSIRO Division of Applied Physics Institute of Industrial Technologies of Lindfield, New South Wales, Australia. Using this kind of device, penetration depth of a Berkovich pyramidal diamond indenter having a 65° included cone angle is measured as function of the applied force up to the maximum load. After the maximum load has been applied, the material is allowed to relax in an elastic manner against the indenter. It is usually assumed that the gradient of the upper portion of the unloading data is found to be linearly proportional to force. Sneddon's analysis provides a relationship between the indenting force and plastic and elastic components of the penetration depth (Sneddon I.N. *Int. J. Eng. Sci.* 3, pp. 47–57 (1965)). From an examination of Sneddon's equation, the elastic modulus may be recovered in the form $E/(1-v^2)$. The calculation uses the equation:

$$E/(1-v^2)=(dF/dh_e)F_{max}1/(3.3h_{pmax}\tan(\theta))$$

where:

v is Poisson's ratio of the sample being tested;

$(dF/dh_e)$ is the gradient of the upper part of the unloading curve;

$F_{max}$ is the maximum applied force;

$h_{pmax}$ is the maximum plastic penetration depth;

θ is the half-included cone angle of the Berkovich pyramidal indenter; and

E is the elastic modulus.

Values obtained under the nanoindentation technique may have to be correlated back to ASTM D 882-75b.

As discussed above in relation to the fundamental principles behind the optical properties of cube-corner elements, even slight distortion of the geometry of cube-corner elements can result in substantial degradation of optical properties of the cube-corner elements. Thus, higher elastic modulus materials are preferable for the cube-corner elements due to their increased resistance to distortion. The overlay film of the composite retroreflective sheeting is preferably a polymeric material of somewhat lower elastic modulus.

During curing of the cube-corner component, depending on the composition of the cube-corner material, individual cube-corner elements may experience a certain degree of shrinkage. If the elastic modulus of the overlay film is too high, torsional stresses can be applied to the cube-corner elements if they shrink during curing. If the stresses are sufficiently high, then the cube-corner elements can become distorted with a resulting degradation in optical performance. When the elastic modulus of the overlay film is sufficiently lower than the modulus of the cube-corner element material, the overlay film can deform along with the shrinkage of cube-corner elements without exerting such deformational stresses on the cube-corner elements that would lead to undesirable degradation of the optical characteristics. The modulus differential between the overlay film and the cube-corner elements should be on the order of 1.0 to $1.5 \times 10^7$ pascals or more.

As the height of the cube-corner elements diminishes, it is possible for this modulus differential to reach the low end of the range given immediately above. However, it should be kept in mind that there is a practical lower limit to the modulus of the cube-corner element material. Below a certain level, generally on the order of about 2.0 to $2.5 \times 10^8$ pascals for cube-corner elements about 175 microns (0.007 inches) in height, less for smaller cube-corner elements, the cube-corner elements become too flexible and do not possess sufficient mechanical rigidity to properly fracture upon application of stress. The cube-corner elements preferably have an elastic modulus of greater than about $25 \times 10^8$ pascals.

After curing, the thickness of the land area, i.e., the thickness of the cube-corner array material opposite the plane defined by the bases of the cube-corner elements, is preferably less than 10 percent of the height of the cube-corner elements, and more preferably less than 1 percent thereof.

Preferably the resin will shrink at least 5 percent by volume when cured, more preferably between 5 and 20 percent by volume, when cured. It has been found that by using resin compositions of this type, cube-corner arrays with minimal or no land area thickness can be more easily formed, thereby achieving the high flexibility. For instance, resin compositions that shrink when cured will tend to retreat into the cube-corner-shaped cavity, tending to leave a land area that only connects adjacent cavities and therefore adjacent cube-corners with a narrow portion if applied to the tool in appropriate quantities. The narrow portion is readily broken resulting in decoupling of individual cube-corner elements as discussed below. Sheeting can in theory be formed with essentially no land area connecting adjacent cube-corner elements, however, in typical high volume manufacturing arrangements, a minimal land area having a thickness of up to 10 percent of the height of the cubes, preferably on the order of 1 to 5 percent, will be formed.

Resins selected for use in the array of cube-corner elements include cross-linked acrylate such as mono- or multi-functional acrylates or acrylated epoxies, acrylated polyesters, and acrylated urethanes blended with mono- and multi-functional monomers are typically preferred. These polymers are typically preferred for one or more of the following reasons: high thermal stability, environmental stability, and clarity, excellent release from the tooling or mold, and high receptivity for receiving a reflective coating.

Examples of materials suitable for forming the array of cube-corner elements are reactive resin systems capable of being cross-linked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Reactive resins suitable for forming the array of cube-corner elements may be blends of photoinitiator and at least one compound bearing an acrylate group. Preferably the resin blend contains a monofunctional, a difunctional, or a polyfunctional compound to ensure formation of a crosslinked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of crosslinked resins that may be used in cube-corner element arrays.

Ethylenically unsaturated resins include both monomeric and polymeric compounds that contain atoms of carbon, hydrogen and oxygen, and optionally nitrogen, sulfur, and the halogens may be used herein. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily cross linked.

Some illustrative examples of compounds having an acrylic or methacrylic group that are suitable for use in the invention are listed below:

(1) Monofunctional compounds:
   ethylacrylate, n-butylacrylate, isobutylacrylate, 2-ethylhexylacrylate, n-hexylacrylate, n-octylacrylate, isooctyl acrylate, isobornyl acrylate, tetrahydrofurfuryl acrylate, 2-phenoxyethyl acrylate, and N,N-dimethylacrylamide;

(2) Difunctional compounds:
   1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional compounds:
   trimethylolpropane triacrylate, glyceroltriacrylate, pentaerythritol triacrylate, pentaerythritol tetraacrylate, and tris(2-acryloyloxyethyl)isocyanurate.

Monofunctional compounds typically tend to provide faster penetration of the material of the overlay film and difunctional and polyfunctional compounds typically tend to provide more crosslinked, stronger bonds within and between the cube-corner elements and overlay film. Some representative examples of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Illustrative examples of photopolymerization initiators that can be blended with acrylic compounds in cube-corner arrays include the following: benzil, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. The compounds may be used individually or in combination.

Cationically polymerizable materials including but are not limited to materials containing epoxy and vinyl ether functional groups may be used herein. These systems are photoinitiated by onium salt initiators, such as triarylsulfonium, and diaryliodonium salts.

Preferably, the overlay film used is a polymeric material selected from the group consisting of ionomeric ethylene copolymers, plasticized vinyl halide polymers, acid functional polyethylene copolymers, aliphatic polyurethanes, aromatic polyurethanes, other light transmissive elastomer, and combinations thereof. Such materials typically provide overlay films that are imparted with the desired durability and flexibility to the resultant retroreflective sheeting while permitting desired preferred penetration by the cube-corner element resin composition.

The overlay film preferably comprises a low elastic modulus polymer, e.g., less than about $13 \times 10^8$ pascals, to impart easy bending, curling, flexing, conforming, or stretching to the resultant retroreflective composite. Generally, the overlay film comprises a polymer having a glass transition temperature less than about 50° C. The polymer preferably is such that the overlay film retains its physical integrity under the conditions it is exposed to as the resultant composite retroreflective sheeting is formed. The polymer desirably has a Vicat softening temperature that is greater than 50° C. The linear mold shrinkage of the polymer desirably is less than 1 percent, although certain combinations of polymeric materials for the cube-corner elements and the overlay will tolerate a greater extent of shrinkage of the overlay material. Preferred polymeric materials used in the overlay are resistant to degradation by UV light radiation so that the retroreflective sheeting can be used for long-term outdoor applications. The overlay film should be light transmissive and preferably is substantially transparent.

The overlay film may be either a single layer or multilayer component as desired. Either surface of the overlay film may contain printed or formed (such as stamped or embossed) symbols. If multilayer, the layer to which the array of cube-corner elements is bonded should have the properties described herein as useful in that regard with other layers not in contact with the array of cube-corner elements having selected characteristics as necessary to impart desired characteristics to the resultant composite retroreflective sheeting. An alternate overlay is disclosed in U.S. patent application Ser. No. 08/516,165 filed Aug. 17, 1995.

The overlay film should be sufficiently extensible to achieve decoupling of the cube-corner elements as discussed herein. It may be elastomeric, i.e., tend to recover to at least some degree after being elongated, or may have substantially no tendency to recover after being elongated, as desired. Illustrative examples of polymers that may be employed in overlay films herein include:

(1) Fluorinated polymers such as: poly(chlorotrifluoroethylene), for example KEL-F800 Brand available from Minnesota Mining and Manufacturing, St. Paul, Minn.; poly(tetrafluoroethylene-cohexafluoropropylene), for example EXAC FEP Brand available from Norton Performance, Brampton, Mass.; poly(tetrafluoroethylene-co-perfluoro(alkyl)vinylether), for example, EXAC PEA Brand also available from Norton Performance; and poly(vinylidene fluoridecohexafluoropropylene), for example, KYNAR FLEX-2800 Brand available from Pennwalt Corporation, Philadelphia, Pa.;

(2) Ionomeric ethylene copolymers such as: poly (ethylene-co-methacrylic acid) with sodium or zinc ions such as SURLYN-8920 Brand and SURLYN-9910 Brand available from E.I. duPont Nemours, Wilmington, Del.;

(3) Low density polyethylenes such as: low density polyethylene; linear low density polyethylene; and very low density polyethylene;

(4) Plasticized vinyl halide polymers such as plasticized poly(vinychloride);

(5) Polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n$— where n is 0 to 12, and poly(ethylene-co-vinylacetate); and (6) Aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether gylcol, polycaprolactonediol, poly-1,2-butylene oxide glycol, and combinations of these polydiols, and (3) chain extenders such as butanediol and hexanediol. Commercially available urethane polymers include: PN-04, or 3429 from Morton International Inc., Seabrook, N.H., or X-4107 from B. F. Goodrich Company, Cleveland, Ohio.

Combinations of the above polymers also may be employed in the overlay film. Preferred polymers for the overlay film include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinylchloride); and the aliphatic urethanes. These polymers are preferred for one or more of the following reasons: suitable mechanical properties, good adhesions to the cube-corner layer, clarity, and environmental stability.

Colorants, ultraviolet ("UV") absorbers, light stabilizers, free radical scavengers or antioxidants, processing aids such as antiblocking agents, releasing agents, lubricants, and other additives may be added to one or both of the retroreflective layer and overlay film if desired, either uniformly in the configuration of a symbol. The particular colorant selected depends on the desired color; colorants typically are added at about 0.01 to 1.5 weight percent for a given layer. UV absorbers typically are added at about 0.5 to 2.0 weight percent. Illustrative examples of suitable UV absorbers include derivatives of benzotriazole such as TINUVIN Brand 327, 328, 900, 1130, TINUVIN-P Brand, available from Ciba-Geigy Corporation, Ardsley, N.Y.; chemical derivatives of benzophenone such as UVINUL Brand M40, 408, D-50, available from BASF Corporation, Clifton, N.J.; SYNTASE Brand 230, 800, 1200 available from Neville-Synthese Organics, Inc., Pittsburgh, Pa.; or chemical derivatives of diphenylacrylate such as UVINUL Brand N35, 539, also available from BASF Corporation of Clifton, N.J. Light stabilizers that may be used include hindered amines, which are typically used at about 0.5 to 2.0 weight percent. Examples of hindered amine light stabilizers include TINUVIN Brand 144, 292, 622, 770, and CHIMASSORB Brand 944 all available from the Ciba-Geigy Corp., Ardsley, N.Y. Alternate hindered amines are disclosed in U.S. Pat. No. 5,387,458. Free radical scavengers or antioxidants may be used, typically, at about 0.01 to 0.5 weight percent. Suitable antioxidants include hindered phenolic resins such as IRGANOX Brand 1010, 1076, 1035, or MD-1024, or IRGAFOS Brand 168, available from the Ciba-Geigy Corp., Ardsley, N.Y. Small amounts of other processing aids, typically no more than one weight percent of the polymer resins, may be added to improve the resin's processability. Useful processing aids include fatty acid esters, or fatty acid amides available from Glyco Inc., Norwalk, Conn., metallic stearates available from Henkel Corp., Hoboken, N.J., or WAX E Brand available from Hoechst Celanese Corporation, Somerville, N.J.

The present retroreflective article can be made in accordance with two different techniques. In the first technique, a retroreflective article is made by providing a first cube-corner sheeting that has the cubes arranged in a conventional configuration, namely, a non-random orientation, and deforming this sheeting under heat and/or pressure. In the second technique, the deformed retroreflective article can be used to create tooling. The tooling may be used as a mold to cast or form additional retroreflective articles.

Figure 11:
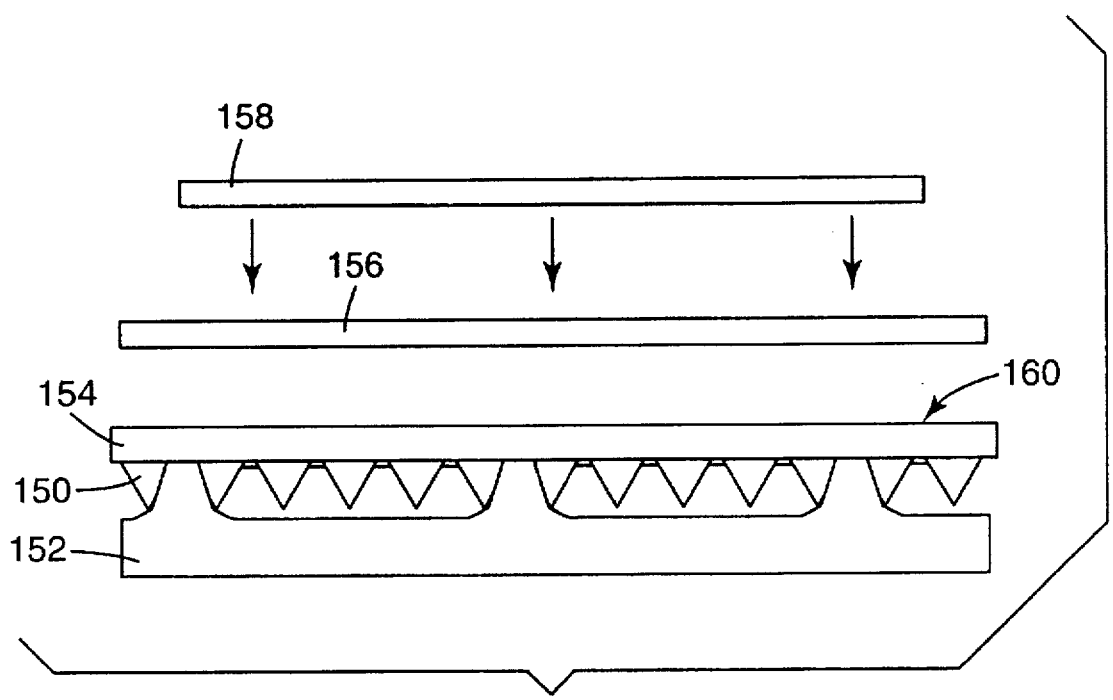
FIG. 11 is a schematic illustration of a method of preparing a retroreflective article.
Figure 12:
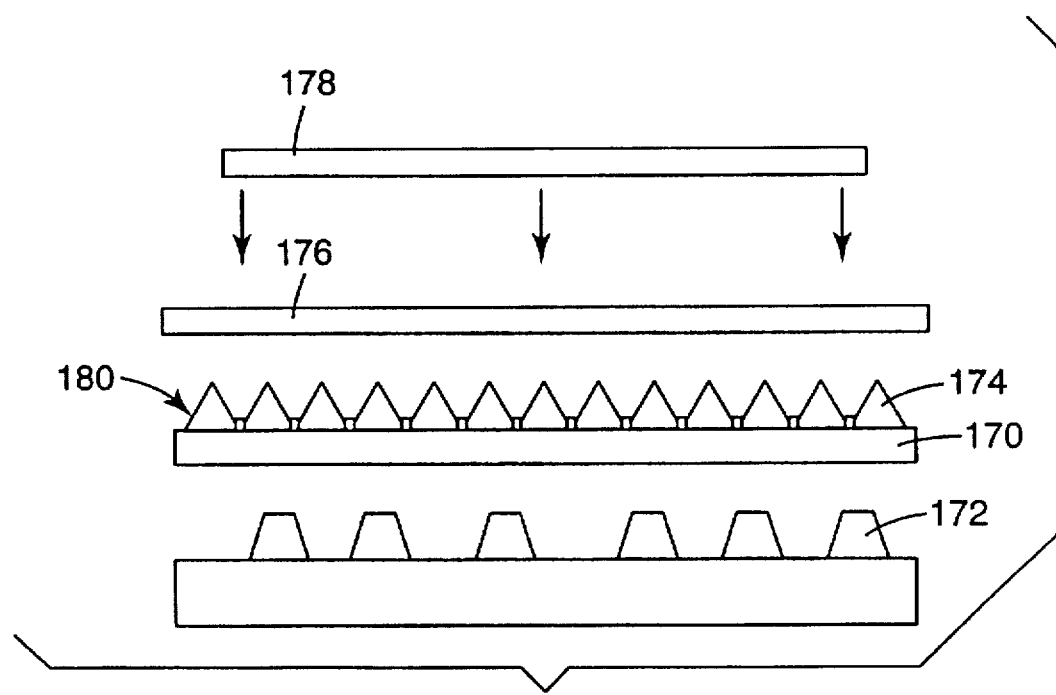
FIG. 12 is a schematic illustration of an alternate method of preparing a retroreflective article.

In one embodiment, the retroreflective article of the present invention is made by thermoforming the cube-corner retroreflective sheeting over a structured three-dimensional surface of a mold, such as illustrated in FIGS. 11 and 12. In FIG. 11, the cube-corner elements 150 are placed over the structured surface of a mold 152. The overlay film 154 is located opposite an isolation web 156 to prevent the overlay film 154 from melting or adhering to diaphragm 158. Alternatively, the diaphragm 158 may have release properties that perform the function of the isolation web 156. Heat and/or pressure are applied to the retroreflective sheeting 160 through the thermoforming diaphragm 158. The three-dimensional shape of the mold 152 may also include a variety of embossed symbols.

In an alternate embodiment illustrated in FIG. 12, overlay film 170 is placed on the structured surface of a mold 172. The cube-corner elements 174 is located opposite an isolation web 176. Heat and/or pressure are applied to the retroreflective sheeting 180 through the diaphragm 178. An apparatus suitable for thermoforming the retroreflective sheeting to form the present retroreflective article is available under the trade designation Scotchlite™ Heat Lamp Vacuum Applicator available from Dayco Industries, Inc. of Niles, Mich. or P.M Black Co. of Stillwater, Minn.

Important thermoforming processing variables that may determine the nature of the retroreflective article created include temperature, pressure, duration of each, thickness and thermal characteristics of the thermoforming diaphragm and the nature of the structured surface on the mold. The size, uniformity and rigidity of the mold may also alter the processing specifications of the thermoforming process as well as whether the mold has an optical or a non-optical pattern. The construction of the retroreflective sheeting, such as the thickness, softening temperature and extensibility of the overlay film, size of the cube-corner elements, the presence or absence of a vapor coat, whether a sealing film is present and the optical design of the retroreflective sheeting may also determine thermoforming processing variables.

Vacuum forming yields a retroreflective article in which the overlay film becomes thinner in proportion to the distance the sheet travels to contact the mold surface. Consequently, the spacing gradient between adjacent cube-corner elements increases from the top of a protrusion on the mold toward the bottom of the depression. The increased spacing generally produces lower retroreflectivity. Additionally, if the retroreflective sheeting includes a sealing film, the film is visible through the gap between the cube-corner elements. The sealing film may be applied either before or after deformation of the cube-corner sheeting. The sealing film may include one or more colors that would be visible during daytime viewing.

In an embodiment in which the cube-corner elements of the retroreflective sheeting are coated with a specular reflector, a colored back coating may be visible through separations between the cube-corner elements. A colored back coating or adhesive serves to soften or alter the color and reduce the "grayness" of the specular reflector layer. Alternatively, the specular reflector may be a "non-silver" color, such as copper.

In an alternate embodiment, the retroreflective sheeting may be deformed by drape forming. The thickness distribution of the overlay film using drape forming is opposite that of vacuum forming, so that the spacing gradient between the cube-corner elements increases along the top of a protrusions during formation, while the spacing between cube-corner elements along the bottom of a depression remains generally the same. The retroreflective sheeting may also be stretched in one or more directions prior to or during deformation. Stretching increases the gap between adjacent cube-corner elements and thereby reduces retroreflectivity. Reduced retroreflectivity may be desirable for some applications.

In an alternate embodiment of the present invention, the retroreflective article of the present invention may be used to prepare a master tooling which can in turn be used to prepare additional retroreflective articles. Retroreflective sheeting may be prepared directly from the tooling. Use of such masters produces sheeting that is capable of retroreflecting light and displays the target optical properties of the original retroreflective article from which the tooling was prepared. Images printed, deposited, or formed directly on the exposed back side of the cube-corner elements by various techniques may also be replicated in the mold making process.

Angularity

Angularity refers to the concept of how retroreflectivity varies as the entrance angle varies. Retroreflectivity varies according to the entrance angle and the observation angle. The entrance angle is the angle between an illumination axis from a light source and a retroreflector axis normal to the surface of the retroreflective article. Entrance angle is usually no larger than 90°. Angularity is typically described in terms of a plot of retroreflectivity on the vertical axis versus entrance angle on the horizontal axis. When the illumination axis, observation axis and retroreflector axis are in the same plane, the entrance angle can be considered negative when the retroreflector axis and observational axis are on opposite sides of the illuminator axis.

The observation angle is the angle between the illumination axis from the light source and the observation axis. The observation angle is always positive and is typically a small acute angle.

Optical Profile

Figure 1:
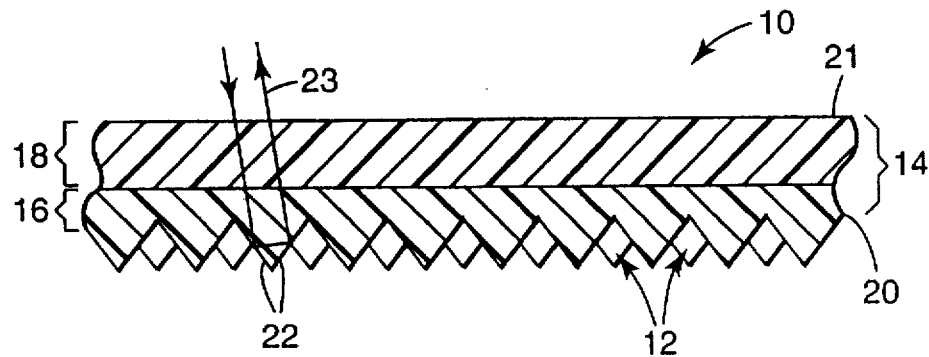
FIG. 1 is a sectional view of a prior art cube-corner retroreflective sheeting.
Figure 2:
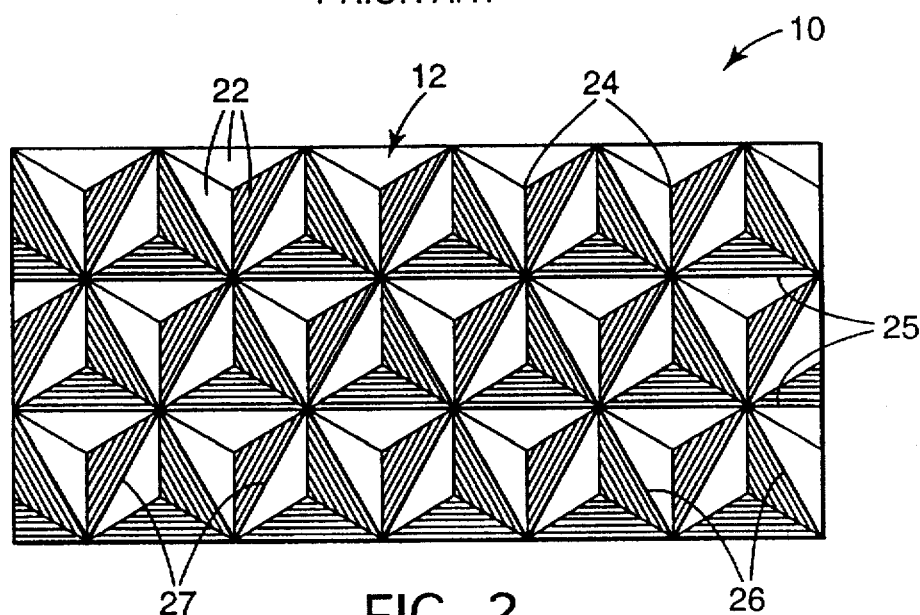
FIG. 2 is a bottom view of the retroreflective sheeting of FIG. 1.
Figure 3:
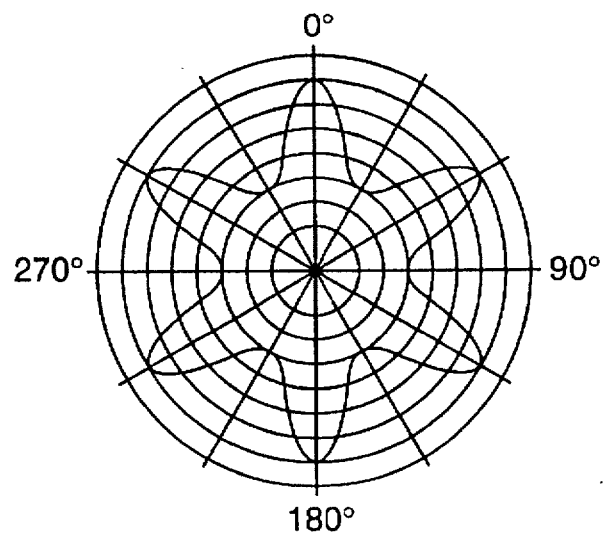
FIG. 3 is a graph in polar coordinates of the optical profile of a cube-corner element having six maxima and six minima at 30° azimuthal intervals.

Optical profile refers to the concept of rotational and orientational symmetry of a retroreflective article. Rotational and orientational symmetry refers to how the retroreflected light varies as the retroreflective article is rotated about a normal perpendicular to the retroreflective surface. Plots of symmetry of rotation indicate how the retroreflective performance of an article will vary when oriented in varying directions about this axis. FIG. 3 is an example of a plot of an optical profile.

EXAMPLES

Features and advantages of this invention are further explained in the following illustrative Examples. For purposes of these Examples, the retroreflective sheeting included cube-corner elements with optical axes tilted or canted with respect to one another, such as generally shown in U.S. Pat. No. 4,588,258 to Hoopman.

Retroreflective Brightness Test

The coefficient of retroreflection, $R_A$, was measured in accordance with standardized test ASTM E 810-93b. RA values are expressed in candelas per lux per square meter $(cd \cdot lx^{-1} \cdot m^{-2})$.

For observation angle scans, the other test parameters were held constant at:

entrance angle=−4.0 degrees orientation angle=0.0 degrees presentation angle=0.0

For entrance angle scans, the other test parameters were held constant at:

orientation angle=0.0 degrees observation angle=0.2 degrees presentation angle=0.0 degrees.

Example 1

Preparation of a flexible retroreflective sheet

One percent by weight of Darocur Brand 4265 (50:50 blend of 2-hydroxy-2-methyl-1-phenylpropan-1-one and 2,4,6-trimethylbenzoyldiphenylphosphine oxide, available from Ciba-Geigy Corp., Hawthorne, N.Y.) was added to a resin blend of 40 percent by weight Photomer Brand 4035 (phenoxyethyl acrylate available from Henkel Corp. of Ambler, Pa.) and 60 percent by weight Photomer Brand 3016 (bis-phenol A epoxy diacrylate available from Henkel Corp. of Ambler, Pa.), and 1 percent by weight Darocur 1173 (2-hydroxy-2-methyl-1-phenylpropan-1-one, available from Ciba-Geigy Corp., Hawthorne, N.Y.). The resulting solution was used as a resin composition for forming cube-corner elements.

The resin composition was cast onto a 0.152 mm (0.006 inches) thick aliphatic polyurethane overlay film (MORTHANE Brand 3429 urethane from Morton International, Inc., Seabrook, N.H.) on a polyethylene terephthalate (PET) carrier film. The coated film was passed between a polyurethane nip roll and the nickel electroformed tool to create 62.5 microns (0.0025 inches) tall cube-corner elements at 57° C. (135° F.). The gap between the 90 durometer polyurethane rubber nip roll and the nickel tool was set to minimize the resin in the cavities. The resin was cured through both the overlay film and the carrier film with one AETEK medium pressure mercury lamp (available from AETEK International of Plainfield, Ill.) set at 160 watts/cm (400 W/in). The feed rate of material through the cure station was 1.524 meters/min. (5 fpm). Upon completion of the microreplication process and removal from the tool, the side of the composite with the cube-corner elements was postcured by irradiating it with a medium pressure mercury lamp (AETEK International) operating at 80 watts/cm (200 w/in).

Example 2

Vacuum-Formed Retroreflective Articles

Figure 16:
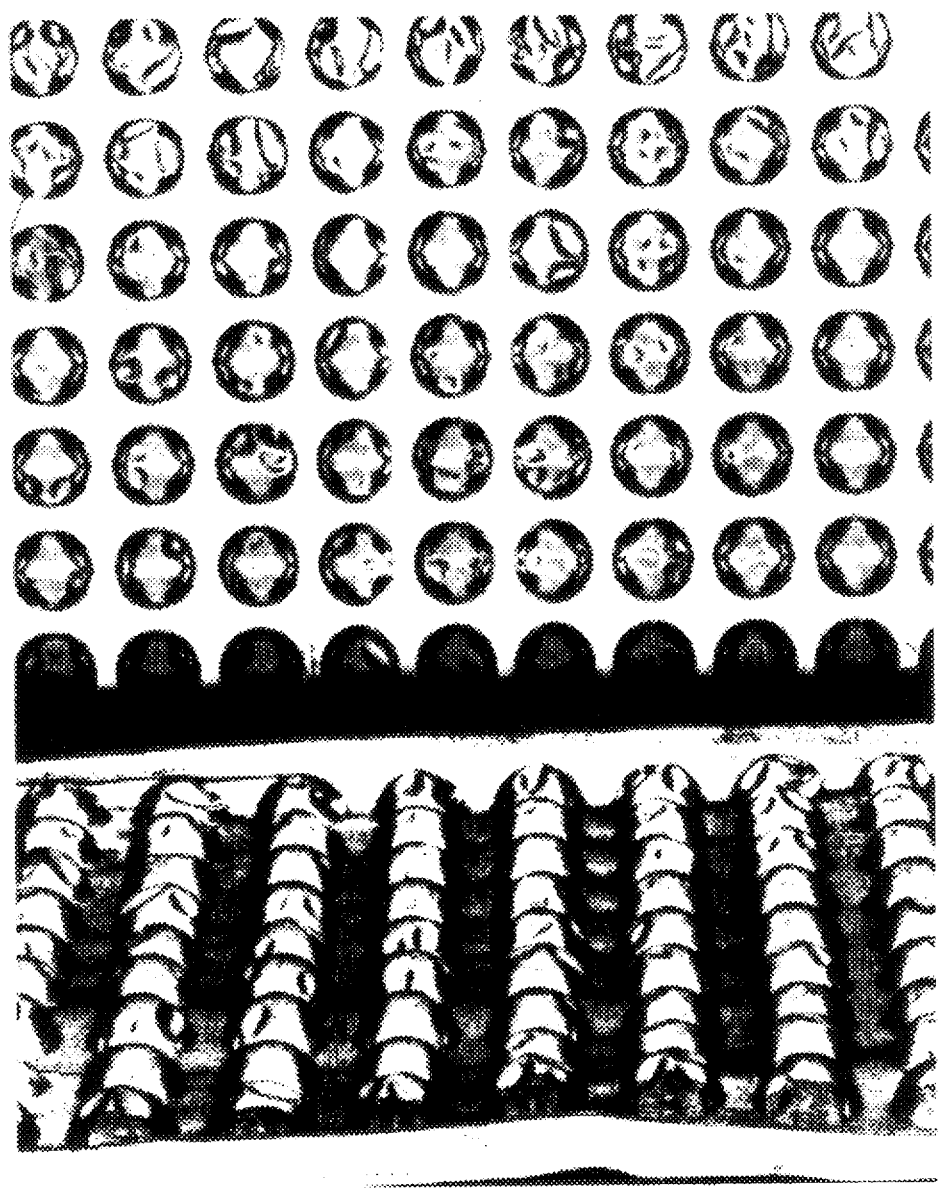
FIG. 16 is a photograph of an exemplary retroreflective article.

The retroreflective sheeting of Example 1 was placed into a clamping frame with the plano-side (overlay film) of the film facing upward on a vacuum-former Type Comet, Jr., Model 10X10 from Comet Industries, Inc. of Sanford, Fla. After heating the film to approximately 150° C. using the resistance heater on the vacuum former, the film started to sag (approximately 20 seconds). The softened composite film was rapidly lowered onto a porous mold bearing a rectangular array of 90 (9×10) hemi-spherical ~1.59 cm (0.625 inch) diameter depressions while a vacuum was being applied to the mold. The softened film formed a reflective sheet with retroreflective hemi-spherical cavities or depressions, shown in both a plan view and a perspective view in FIGS. 13. FIG. 16 illustrates an alternate retroreflective article with hemi-spherical protrusions formed using the process of the present Example.

Figure 13:
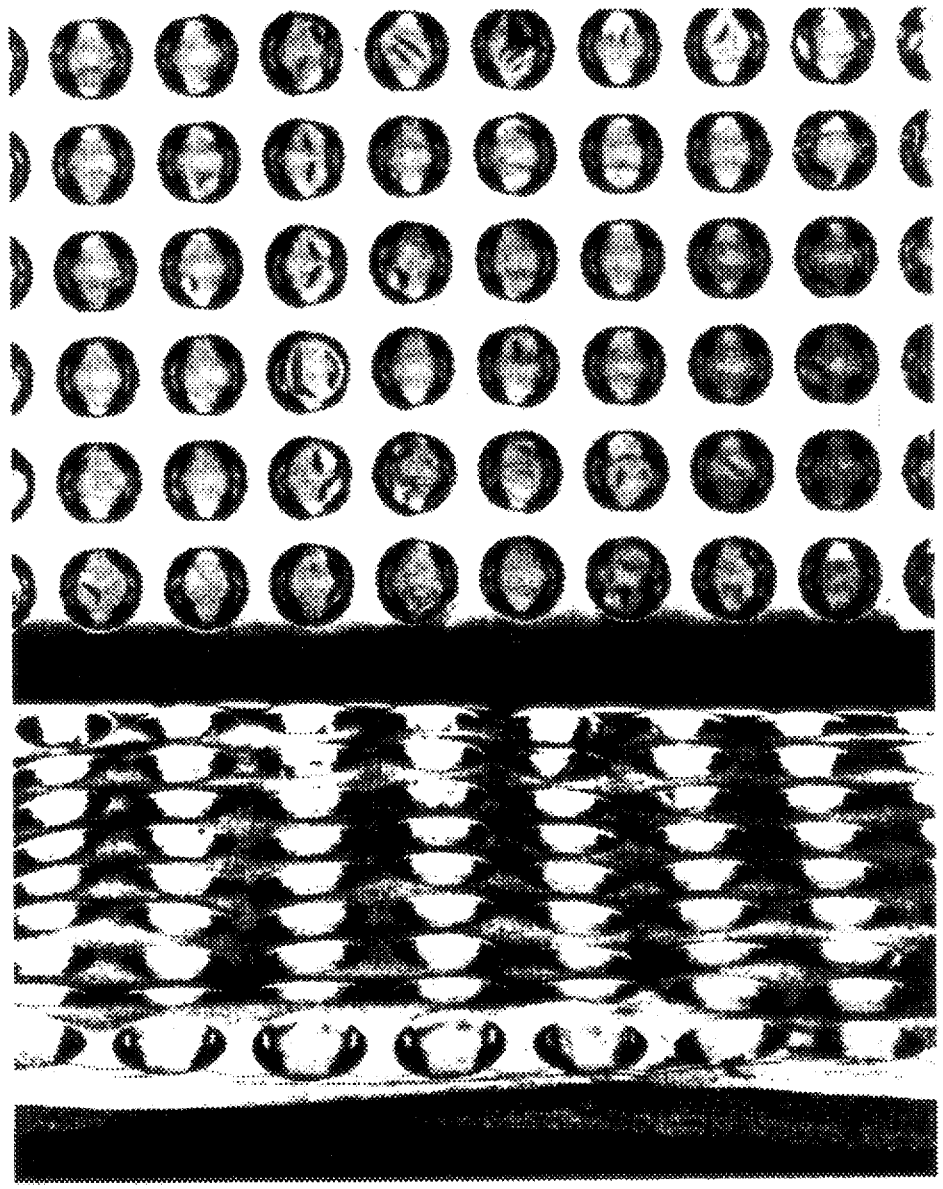
FIG. 13 is a photograph of an exemplary retroreflective article.
Figure 14:
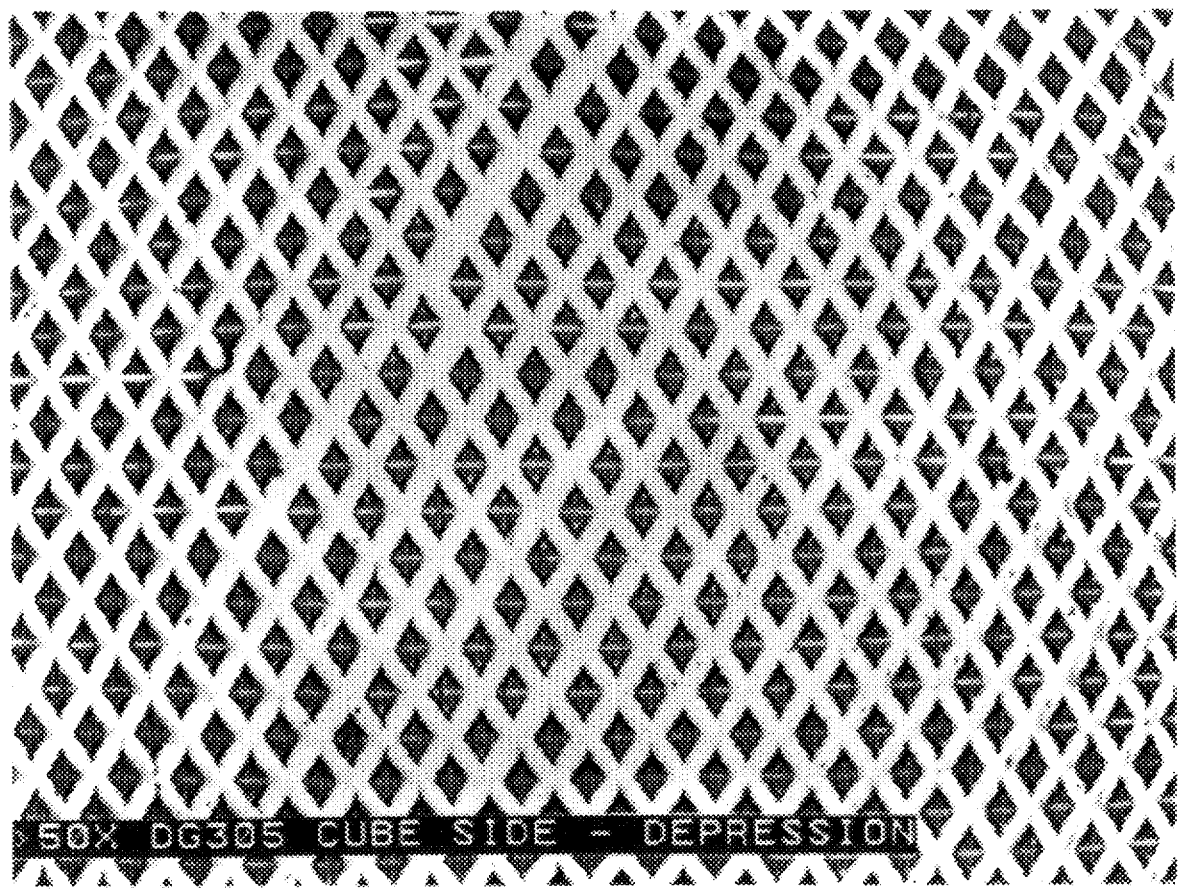
FIG. 14 is a photomicrograph of a depression on the retroreflective article of FIG. 13.
Figure 15:
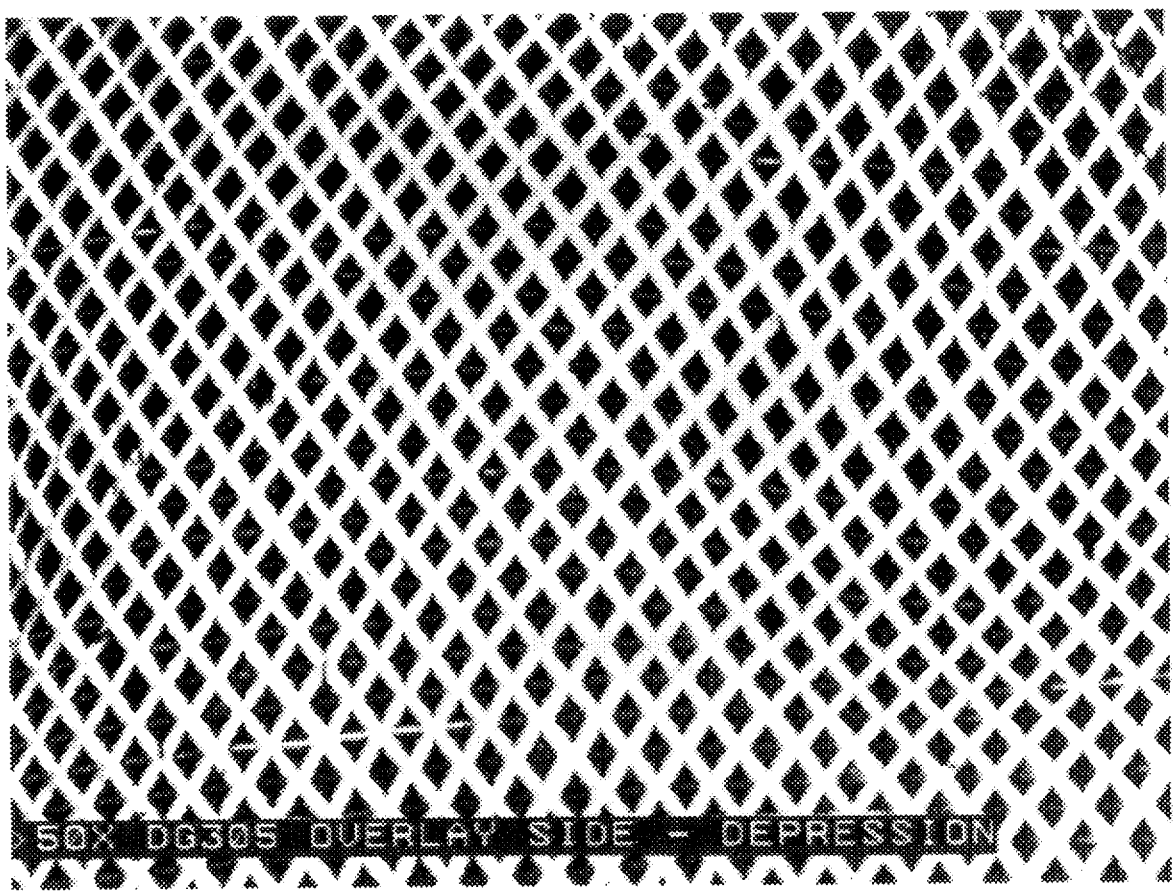
FIG. 15 is a photomicrograph of a depression on the retroreflective article of FIG. 13.

FIG. 14 is a photomicrograph (50X) taken from the cube side of the deformed retroreflective sheeting at the bottom of a vacuum-formed depression of FIG. 13. FIG. 15 is a photomicrograph (50X) taken of a vacuum-formed depression from the overlay side. The cube-corner elements are shown in dark and the separations between them is in white. The photomicrograph illustrates a ratio of the base edge of the cube-corner elements to the separations therebetween is in the range of about 0.5:1 to 2:1. The cube-corner elements are nominally adjacent to one another prior to deformation. As is clear from FIGS. 14 and 15, however, the vacuum forming process stretches and thins the overlay film and increases the separation of the cube-corner elements at the bottom of a depression. The generally uniform separation between the cube-corner elements is enhanced by heating the retroreflective sheeting to soften the overlay film prior to vacuum forming.

Example 3

The retroreflective sheeting of Example 1 was placed into a clamping frame with the plano-side of the film facing downward. The film was heated using the method of Example 2 until the film started to sag (approximately 10–15 seconds). The softened composite film was rapidly lowered onto a porous mold bearing a rectangular array of 90 (9×10) hemi-spherical depressions (~0.75 inch diameter), such as illustrated in FIG. 13, while a vacuum was being applied to the mold. The softened film formed a reflective sheet with retroreflective hemi-spherical protrusions.

Figure 17:
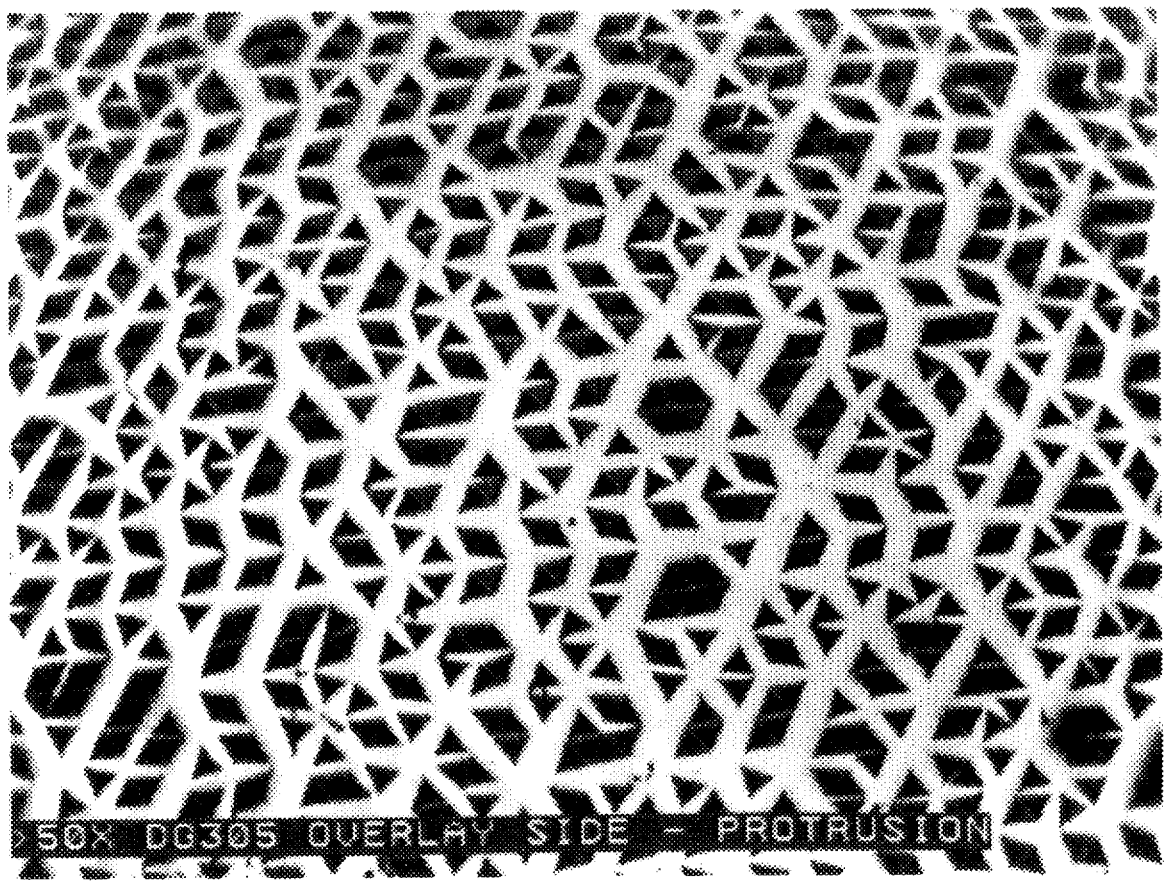
FIG. 17 is a photomicrograph of a protrusion on the retroreflective article of FIG. 16.
Figure 18:
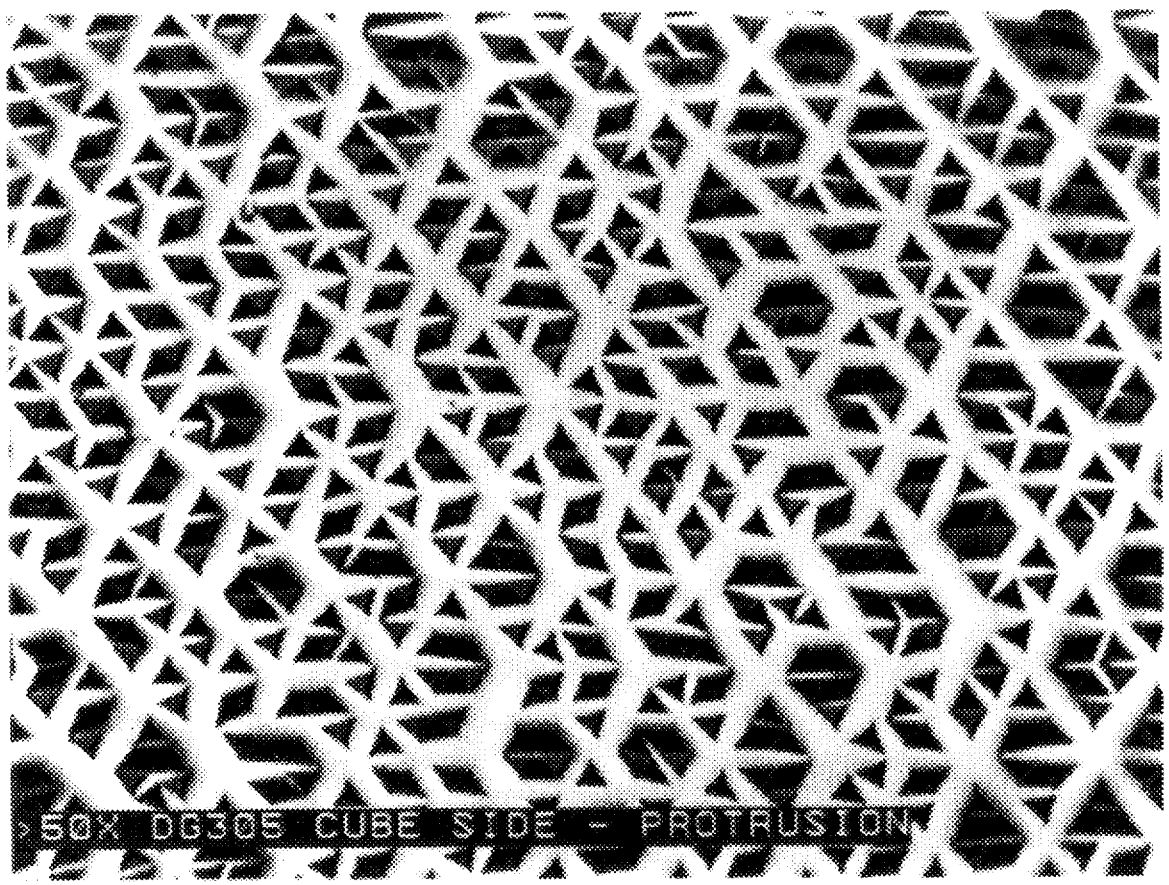
FIG. 18 is a photomicrograph of a protrusion on the retroreflective article of FIG. 16.

FIG. 17 is a photomicrograph (50X) taken from the cube side of the deformed retroreflective sheeting at the top of a vacuum-formed protrusion. FIG. 18 is a photomicrograph (50X) taken of a vacuum-formed protrusion from the overlay side. The cube-corner elements are shown in dark and the separations between them is in white. The cube-corner elements are nominally adjacent to one another. As is clear from FIGS. 17 and 18, however, the vacuum forming process stretches and thins the overlay film and increases the separation of the cube-corner elements at the top of a protrusion. The separations between the cube-corner elements are random due to non-uniform heating and draw, primarily a function of the shortened heating cycle. Some cube-corner elements are grouped together, others are isolated. The random separation of the cube-corner elements created a glittery visual appearance. It will be understood that the separation between the cube-corner elements can be further altered by controlling the draw ratio of the overlay film over the mold.

The present photomicrographs of the retroreflective sheeting with enhanced glittering showed a substantially greater degree of cube-corner element reorientation and separation, than is present on undeformed retroreflective sheeting. It is believed that the enhanced glittering effect is related to the additional reflective paths available to light incident on the adjacent cube-corner elements. Accordingly, there is a general range of glittering image forming abilities of the retroreflective article of the invention which can be achieved by changing the processing variables.

Example 4

Backfilled Formed Retroreflective Article

Figure 19:
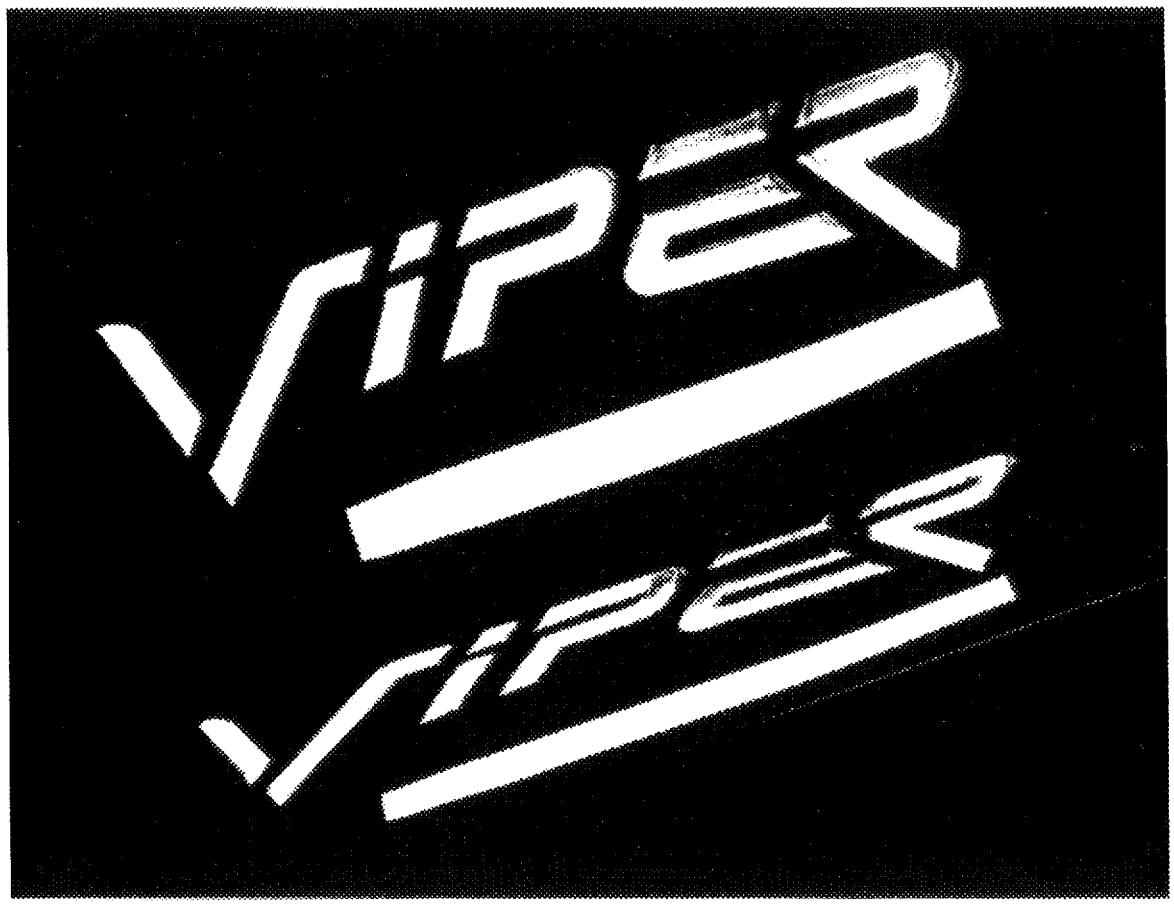
FIG. 19 is a photograph of an exemplary retroreflective article containing a symbol.

The retroreflective sheeting of Example 1 was metallized by vapor deposition of aluminum metal on the cube-corner elements. The metallized retroreflective sheeting was vacuum-formed with the plano-side of the film in contact with a mold to form a series of letters that spelled the word "VIPER" as shown in FIG. 19. While the formed film was still in the mold, a two-part polyurethane was poured into the cavity to backfill the cube-corner elements and thermally cured. The individual letters were cut out and adhered to a steel plate with a gloss black coating. The retroreflective sheeting is generally planar, except along the transition edges of the letters. The retroreflective article exhibited standard retroreflectivity along the planar surface. Some localized glitter-effect was noted along the transition edges of the letters.

Example 5

Preparation of a flexible retroreflective sheeting

A mixture of 1 percent by weight of Darocur Brand 4265 (50:50 blend of 2-hydroxy-2-methyl-1-phenylpropan-1-one and 2,4,6-trimethylbenzoyldiphenylphosphine oxide, available from Ciba-Geigy Corp., Hawthorne, N.Y.) was added to a resin mixture of 19 percent by weight PHOTOMER Brand 3016 (a bisphenol A epoxy diacrylate, available from Henkel Corp., Ambler, Pa.), 49.5 percent by weight TMPTA (trimethylolpropane triacrylate) and 30.5% Sartomer 285 (THFA is tetrahydrofurfiryl acrylate, available from Sartomer Corp.). This resin composition was cast at 57° C. (135° F.) between a tool with 85 microns (0.0034 inches) tall cube-corner elements and an aliphatic polyurethane overlay film 0.114 mm (0.0045 inches) thick (MORTHANE Brand 3429 urethane from Morton International, Inc., Seabrook, N.H.) on a polyethylene terephthalate (PET) carrier film 0.51 mm (0.002 inches) thick. The rubber nip roll gap was set to minimize the amount of resin composition over the cavities of the tool. The resin was cured through both the overlay film and carrier film with one AETEK medium pressure mercury lamp (available from AETEK International of Plainfield, Ill.) set at 160 watts/cm (400 watts/in). The feed rate of material through the cure station was controlled to attain the desired degree of curing (exposure to 100 to 1000 millijoules/cm$^2$). After the microreplication process was completed, the cube-corner side of the composite post-cured by irradiating it with a medium-pressure mercury lamp (AETEK International) operated at 80 watts/cm (200 W/in).

Example 6

Seated Retroreflective Sheeting

The retroreflective sheeting of Example 5 was thermally sealed to a white polyurethane sealing film as follows. A laminate sample of retroreflective sheeting and sealing film was prepared by first protecting it with a 0.025 mm (0.001 inch) polyester terephthalate film. This construction was then fed into a nip between a heated steel embossing roll and a 85 durometer rubber roll. The sealing film was a 0.05 mm (0.002 inches) thick white ($TiO_2$) pigmented aliphatic polyester urethane (MORTHANE Brand PNO3 supplied by Morton International, Seabrook, N.H.). The embossing pattern was of a chain link configuration and the embossing roll surface was 220° C. (410° F.). The rubber roll surface temperature was 63° C. (145° F.). The rolls were turning at a surface speed of 6.09 meters/minute (20 feet/minute), and the force on the nip was held at 114 Newtons/centimeter (65 pounds/inch). The polyester terephthalate protective layers were removed from the samples prior to further use.

Example 7

Preparation of license plate

A 152.4×304.8 mm (6"×12") piece of the retroreflective sheeting with a sealing film was prepared as described in Example 6. The sealed cube sheeting was then laminated to a pressure sensitive adhesive with a liner, product number 467 MP available from Minnesota Mining and Manufacturing Company of St. Paul, Minn. The liner was removed and the sheeting was laminated to a flat, white license plate blank. The resulting article was embossed using conventional license plate embossing techniques. The sample embossed very well and did not tent over the letters. In the view box, the sample was noticeably brighter and whiter than conventional beaded license plate sheeting. The candela/lux/square meter was 200 in the horizontal direction and 300 in the vertical direction.

Example 8

Flexible retroreflective sheeting embossed over netting

Figure 20:
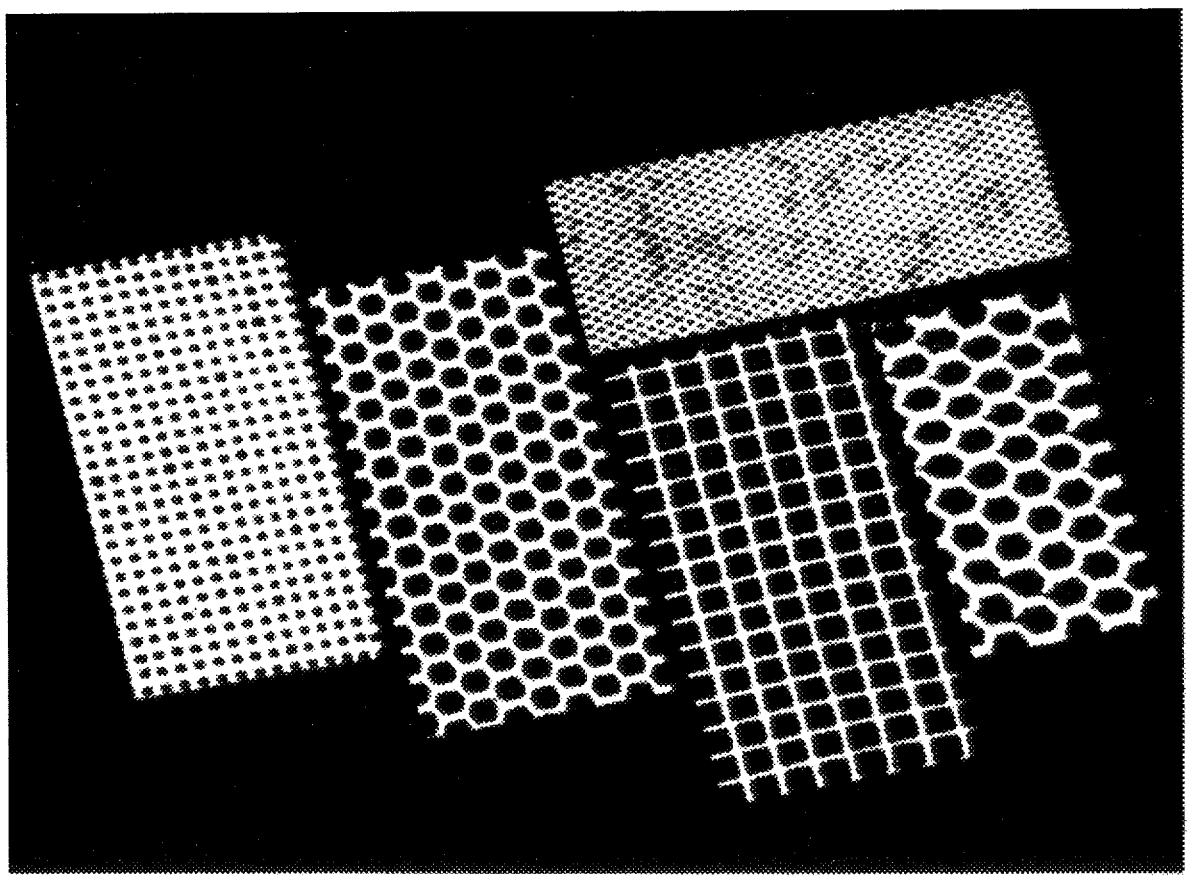
FIG. 20 is a photograph of a plurality of exemplary retroreflective article.

The retroreflective sheeting of Example 6 using a pressure sensitive adhesive was embossed over five samples of small mesh industrial netting, as shown in FIG. 20. Heat lamination of the retroreflective sheeting is preferable, because it helps the retroreflective sheeting conform to the underlying netting. The industrial netting of FIG. 20, viewed from left to right, is sold under the product designations: NO 888 Regent—nylon 6.35 mm (0.25 inch) square; NO 916 nylon delta 1.3 cm (0.5 inch) hex; 504-nylon 1.3 cm (0.5 inch) square; PE-101 polyester 1.59 cm (0.625 inch) hex; and the horizontally orient specimen—NO 61339 polyester 3.175 mm (0.125 inch) hex, all available from Sterling Net Co. of Montclair, N.J.

The netting changed both the angularity of the cube-corner elements and acted as a filler or cushion for the embossed retroreflective sheeting. The portion of the retroreflective sheeting deformed by the netting is shown in white and the space between the netting is shown in black. A localized glitter-effect was visible along the sharp transition regions in the retroreflective sheeting deformed over the netting. It will be understood that a metallized retroreflective sheeting with a suitable adhesive may alternately be embossed over the netting. One possible use could be in temporary pavement markings, which need a different angularity from standard retroreflective sheeting, as well as cushioning when run over by a car.

Example 9

Figure 21:
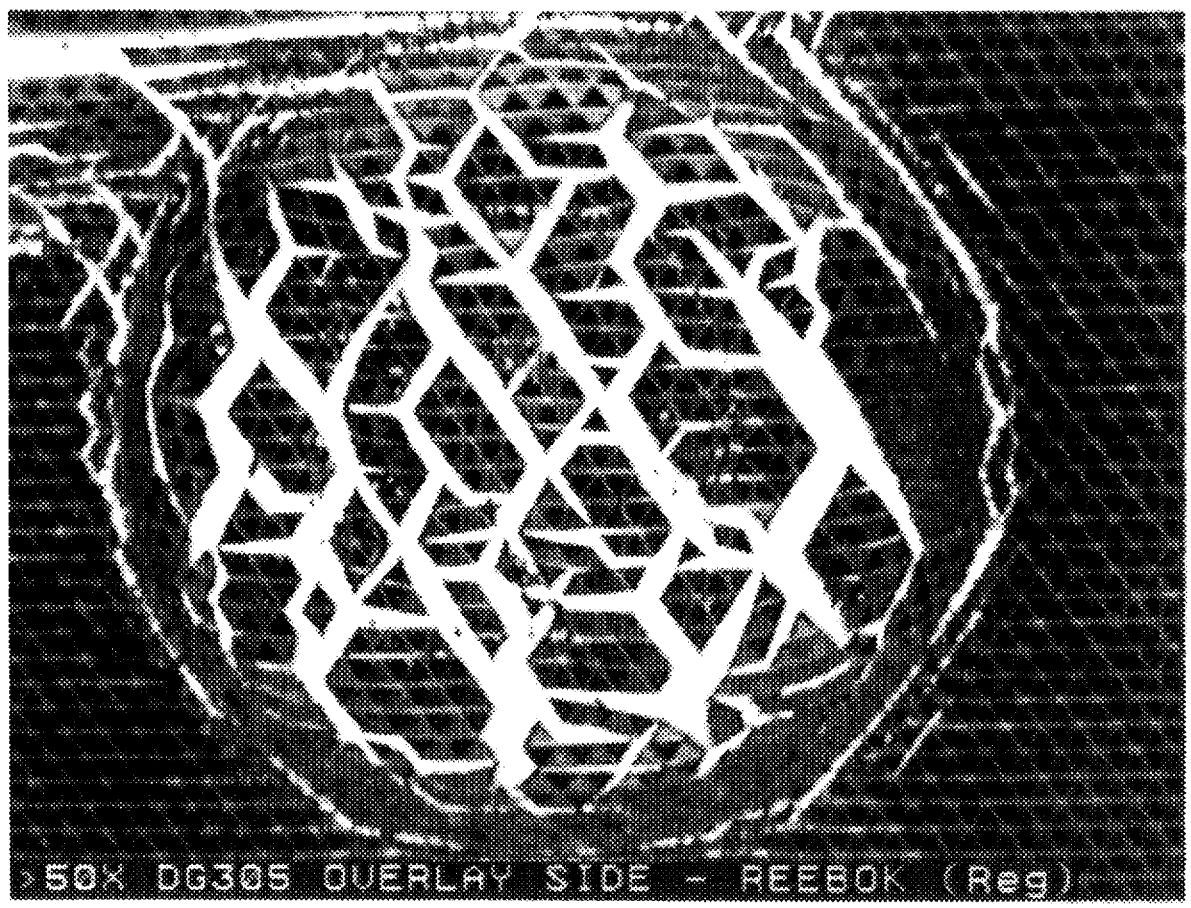
FIG. 21 is a photomicrograph of a retroreflective article containing a ® symbol.

The retroreflective sheeting of Example 1 was vacuum formed on a mold bearing a ® symbol approximately 6.35 mm in diameter. FIG. 21 is a photomicrograph (50X) taken from the overlay side of the retroreflective sheeting. The cube-corner elements are shown in black and the separations in white. The asymmetry of the ® symbol prevented a uniform draw, resulting in substantial randomization of the cube-corner elements.

Example 10

An unsealed retroreflective sheeting according to Example 5 with cube-corner elements 0.086 mm (0.0034 inches) high was thermo-formed over 60, 100, 150 and 220 grit coated abrasive paper available from Minnesota Mining and Manufacturing Company of St. Paul, Minn. using the Scotchlite™ Heat Lamp Vacuum Applicator discussed above. The cube-corner elements were positioned opposite the coated abrasive paper. The bake cycle included warming the applicator to approximately 118° C. and baking for about 1.5–2.5 minutes. The lamp bank was raised at the end of the bake cycle to cool the retroreflective articles.

Figure 22A:
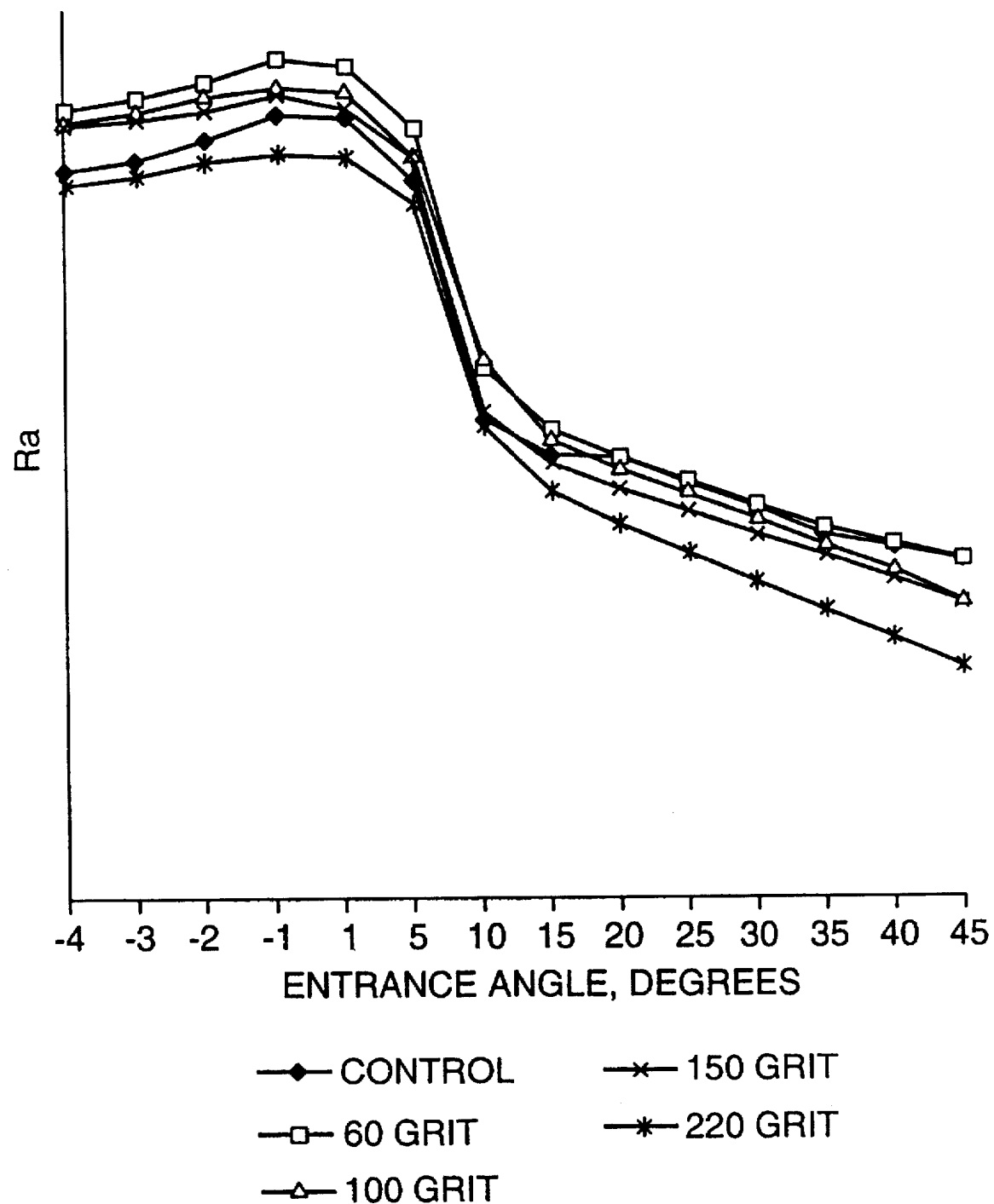
FIG. 22A is a graph of entrance angle versus brightness for various specimens.
Figure 22B:
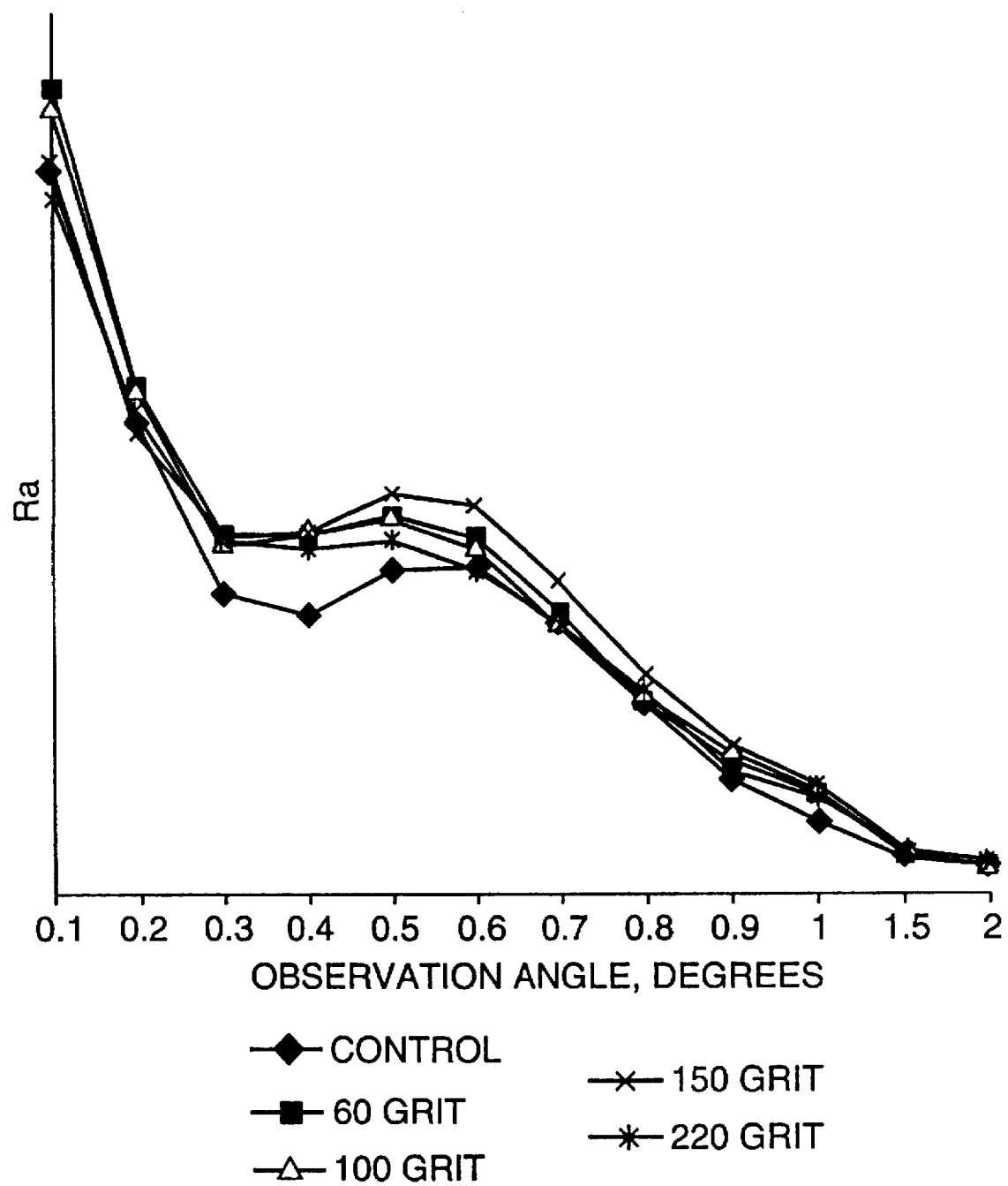
FIG. 22B is a graph of observation angle versus brightness for the specimens of FIG. 22A.

FIG. 22A is a plot of the relative brightness versus entrance angle for the resulting retroreflective articles. FIG. 22B is a plot of the relative brightness versus the observation angle. The control plot is the undeformed retroreflective sheeting. The retroreflective article had a glittery appearance presumably due to the high level of randomization of the base edges of the cube-corner elements.

Example 11

Figure 23A:
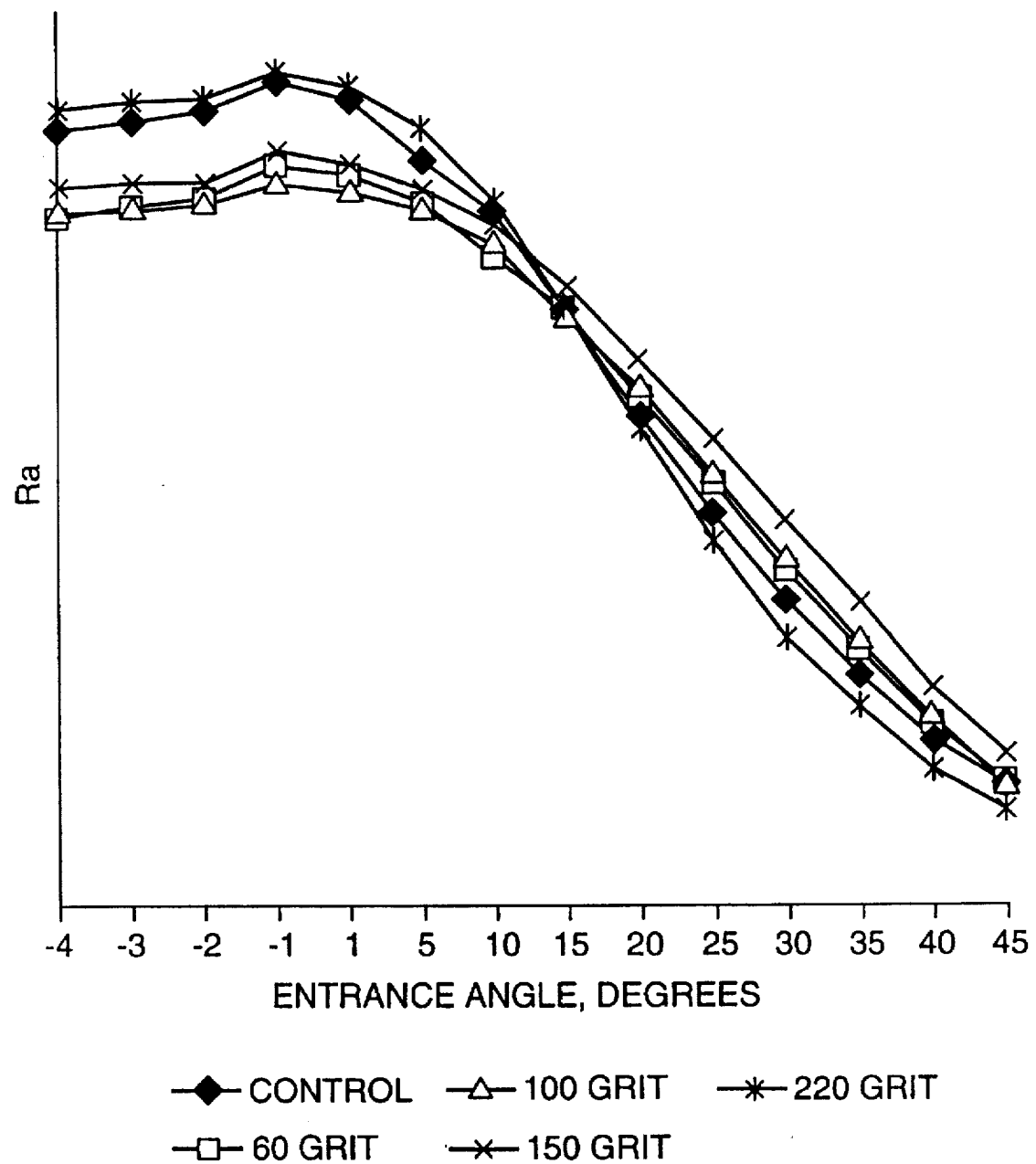
FIG. 23A is a graph of entrance angle versus brightness for various specimens.
Figure 23B:
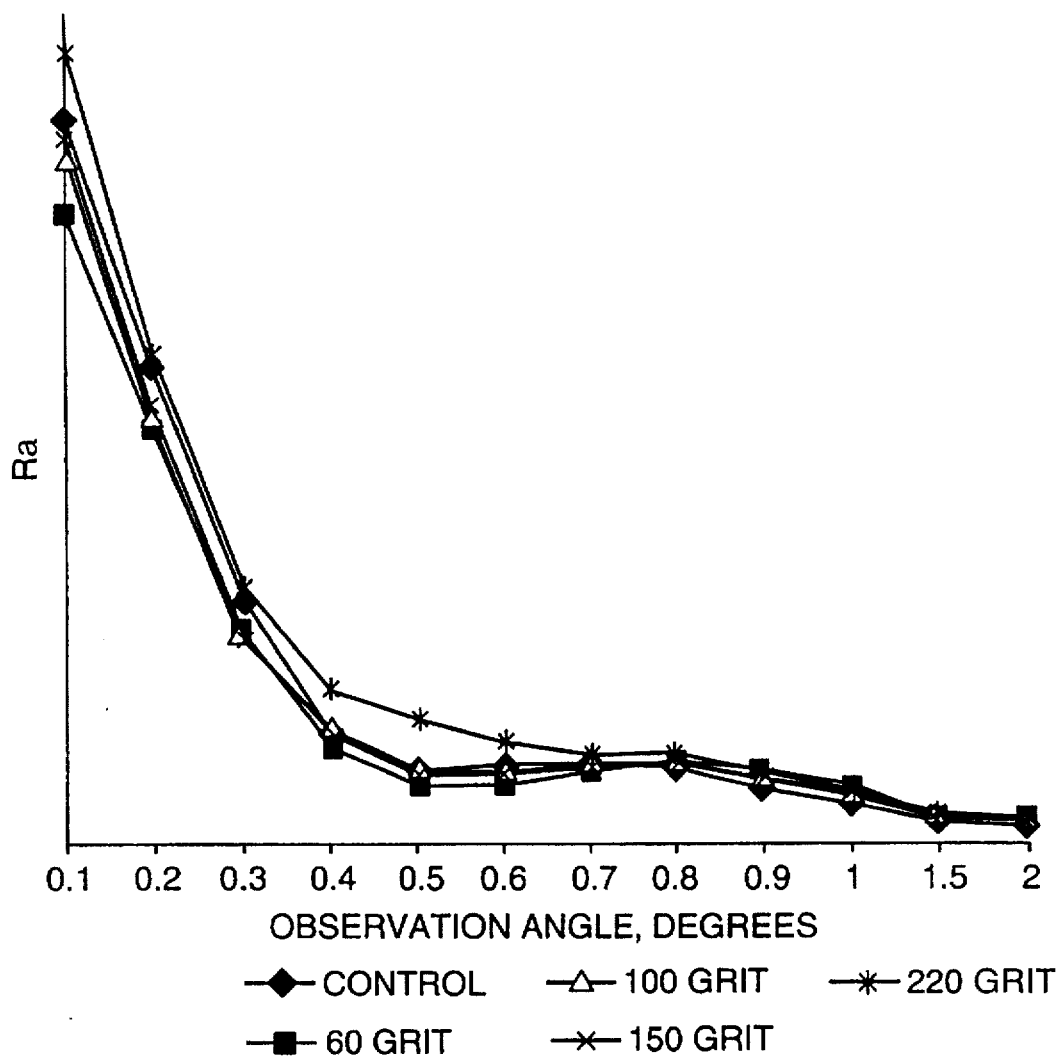
FIG. 23B is a graph of observation angle versus brightness for the specimens of FIG. 23A.

An unsealed retroreflective sheeting according to Example 5 with cube-corner elements 0.086 mm (0.0034 inches) high was metallized by vapor deposition of aluminum metal on the cube-corner elements. The metallized retroreflective sheeting was thermo-formed over 60, 100, 150 and 220 grit coated abrasive paper according to the method of Example 10. The grit designations refer to abrasive particles with diameters no larger than 551 microns, 336 microns, 169 microns and 100 microns, respectively. The cube-corner elements were positioned opposite the coated abrasive paper. FIG. 23A is a plot of the relative brightness versus entrance angle for the resulting retroreflective articles. FIG. 23B is a plot of the relative brightness versus the observation angle. The control plot is the undeformed metallized retroreflective sheeting.

Figure 23C:
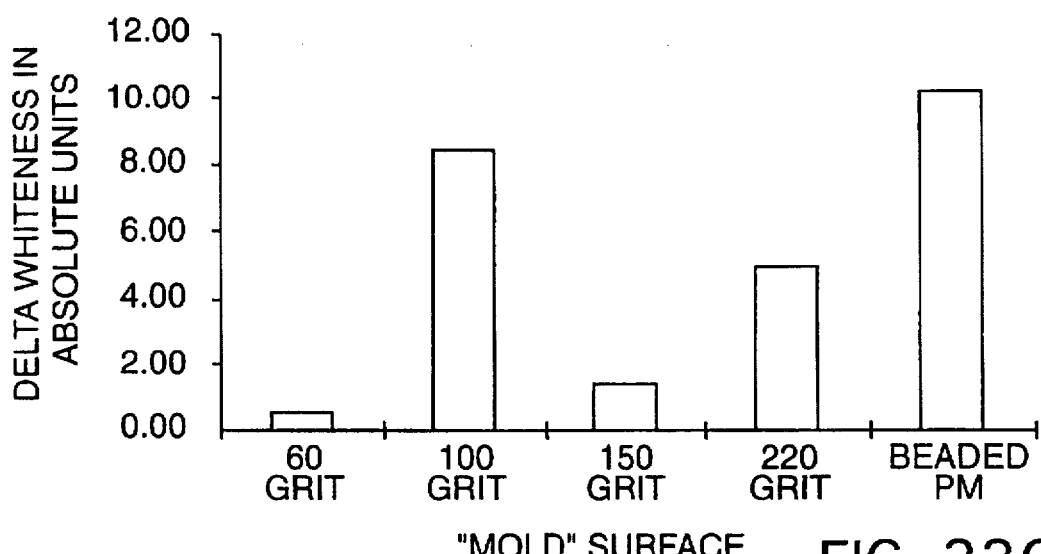
FIG. 23C is a bar graph of change in whiteness of various specimens after deformation.

The retroreflective article had a glittery appearance presumably due to the high level of randomization of the base edges of the cube-corner elements. The retroreflective sheeting was also thermo-formed over a beaded pavement marker available under product designation 5160 Scotchlane™ foil backed tape from Minnesota Mining and Manufacturing Company of St. Paul, Minn. according to the method of Example 10. FIG. 23C is a bar graph showing the increase in whiteness of the retroreflective sheeting after the thermo-forming process for the four coated abrasive paper specimens and the beaded pavement marker. Whiteness is measured using a spectrophotometer with a bidirectional optical measuring system according to ASTM E 1349-90. Whiteness is believed to be an approximate measure of the glittery appearance of retroreflective sheeting. The level of whiteness for the retroreflective article thermo-formed over the 100 grit coated abrasive paper is believe to be a function of the size of the cube-corner elements relative to the grit of the coated abrasive paper. That is, the 100 grit coated abrasive paper provided the greatest level of randomization of the base edges of cube-corner elements 0.086 mm high.

Example 12

An unsealed retroreflective sheeting according to Example 5 with cube-corner elements 0.086 mm (0.0034 inches) high was thermo-formed over a series of specimens using the method of Example 10. The specimen included a beaded pavement marker available under product designation 5160 Scotchlane™ foil backed tape and a raised pavement marker available under product designation A381 Stamark™ high performance tape, both from Minnesota Mining and Manufacturing Company of St. Paul, Minn.; a tool for manufacturing retroreflective sheeting with cube-corner elements 0.178 mm (0.007 inches) high; and a light diffuser available under the product designation Clear Prismatic from Plaskolite, Inc. of Columbus, Ohio. The cube-corner elements were positioned opposite the specimens.

Figure 24A:
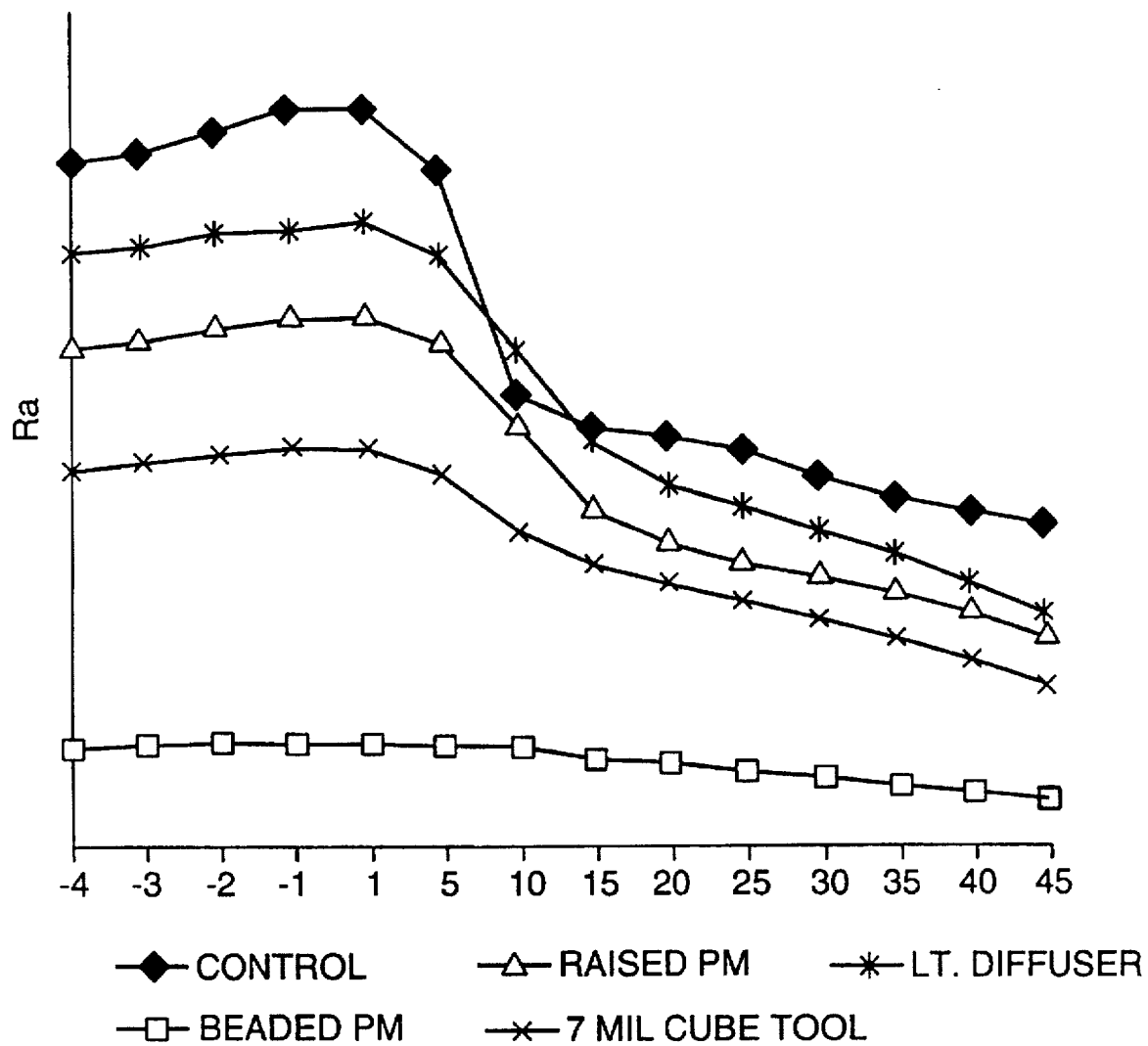
FIG. 24A is a graph of entrance angle versus brightness for various specimens.
Figure 24B:
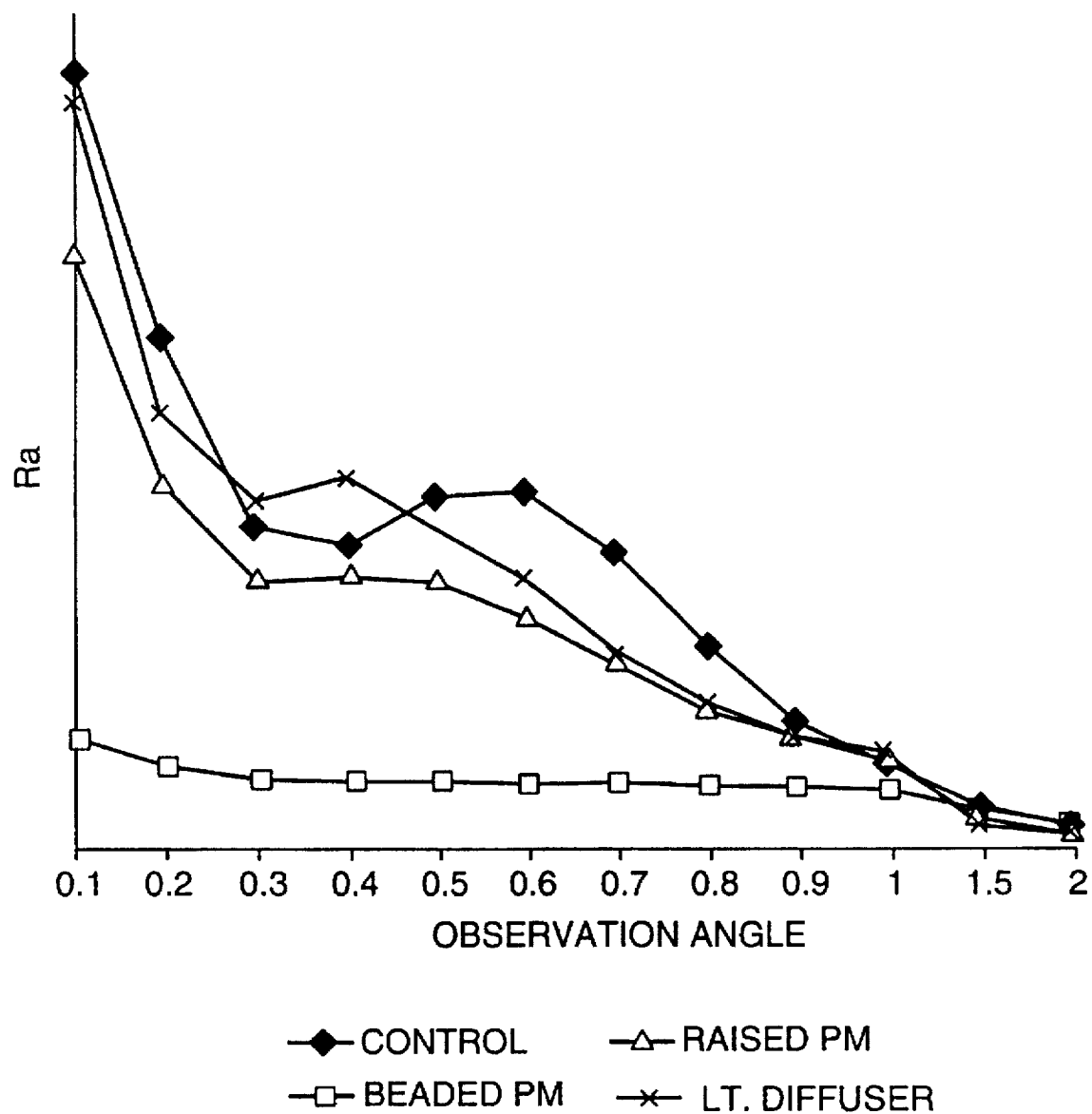
FIG. 24B is a graph of observation angle versus brightness for the specimens of FIG. 24A.

FIG. 24A is a plot of the relative brightness versus entrance angle for the resulting retroreflective articles. FIG. 24B is a plot of the relative brightness versus the observation angle. The control plot is undeformed retroreflective sheeting. Variation in the glittery appearance of the retroreflective articles was presumably due to the various levels of randomization of the base edges of the cube-corner elements.

Example 13

An unsealed retroreflective sheeting according to Example 5 with cube-corner elements 0.086 mm (0.0034 inches) high was metallized by vapor deposition of aluminum metal on the cube-corner elements. The metallized retroreflective sheeting was thermo-formed over the beaded pavement marker, raised pavement marker and light diffuser of Example 12 using the method of Example 10. The cube-corner elements were positioned opposite the specimens.

Figure 25A:
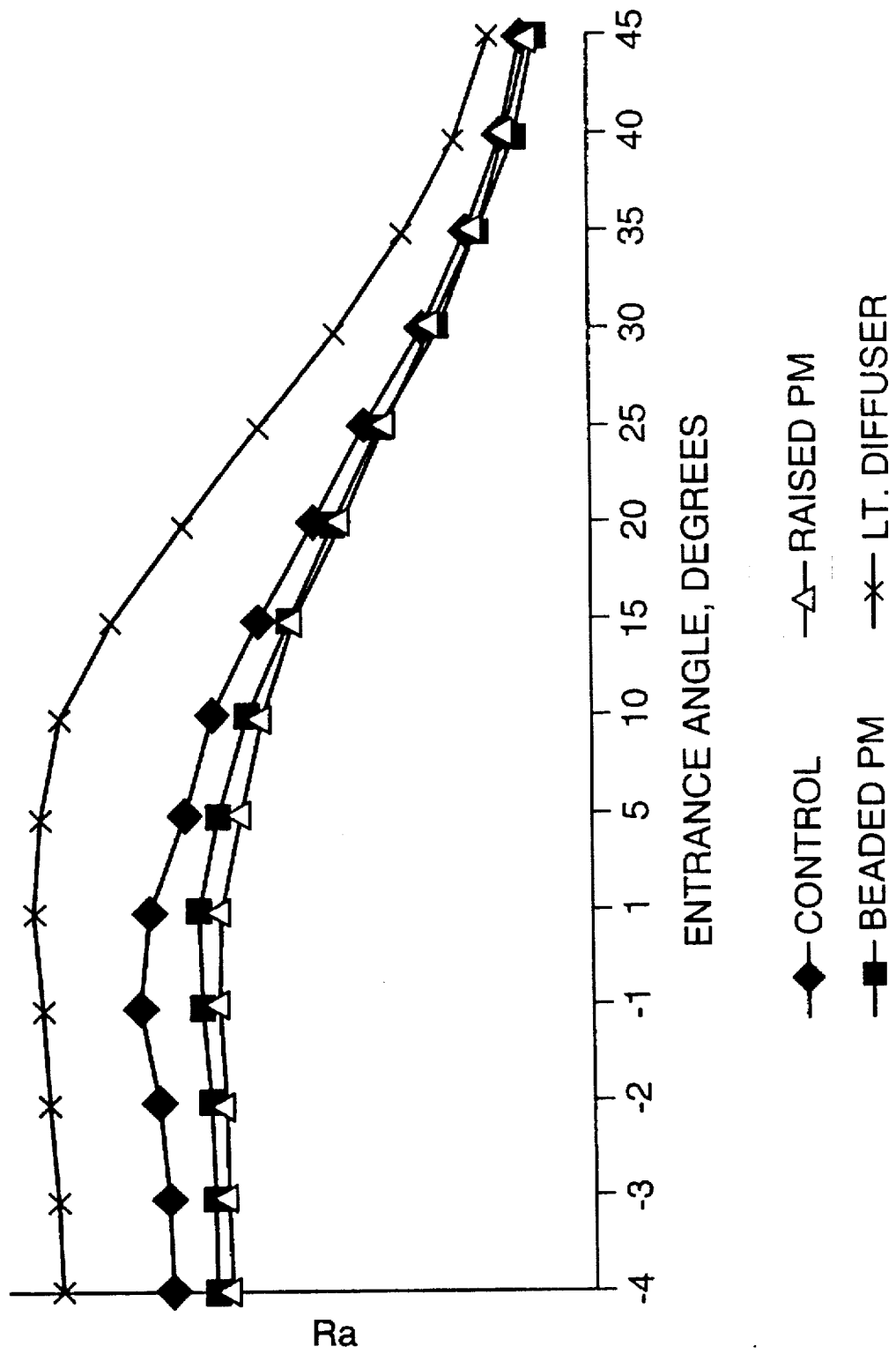
FIG. 25A is a graph of entrance angle versus brightness for various specimens.
Figure 25B:
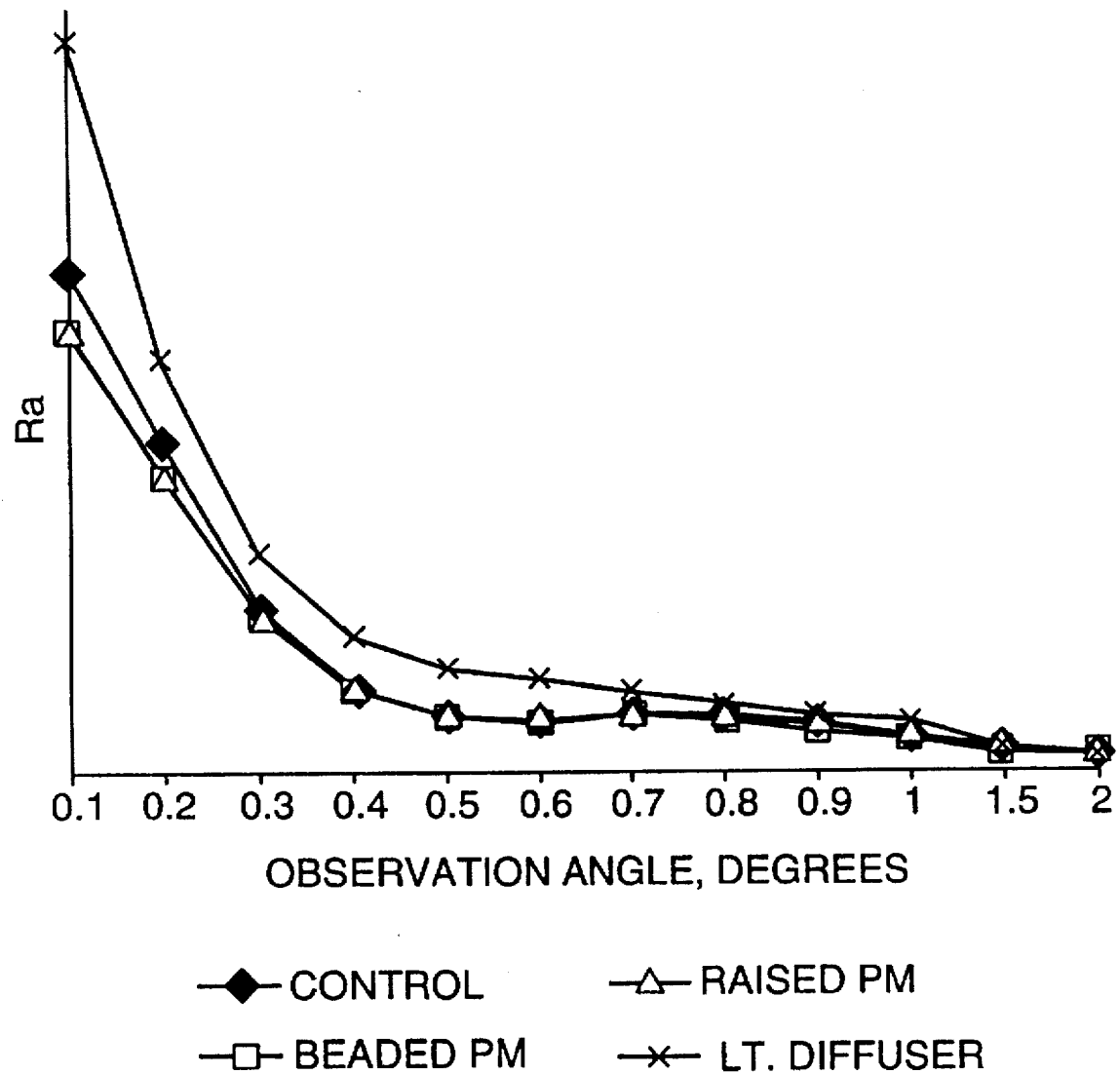
FIG. 25B is a graph of observation angle versus brightness for the specimens of FIG. 25A.

FIG. 25A is a plot of the relative brightness versus entrance angle for the resulting retroreflective articles. FIG. 25B is a plot of the relative brightness versus the observation angle. The control plot is the undeformed retroreflective sheeting.

Example 14

A retroreflective sheeting according to Example 5 with cube-corner elements 0.086 mm (0.0034 inches) high was metallized by vapor deposition of aluminum metal on the cube-corner elements. The metallized retroreflective sheeting was thermo-formed using the method of Example 10 over a polypropylene industrial mesh netting with a 1.27 cm (0.5 inch) hex pattern, sold under the product designation NO916 by Sterling Net Co. of Montclair, N.J. The netting softened during the thermo-forming process and thus remained bonded to the retroreflective sheeting. The cube-corner elements were positioned opposite the specimens.

Figure 26A:
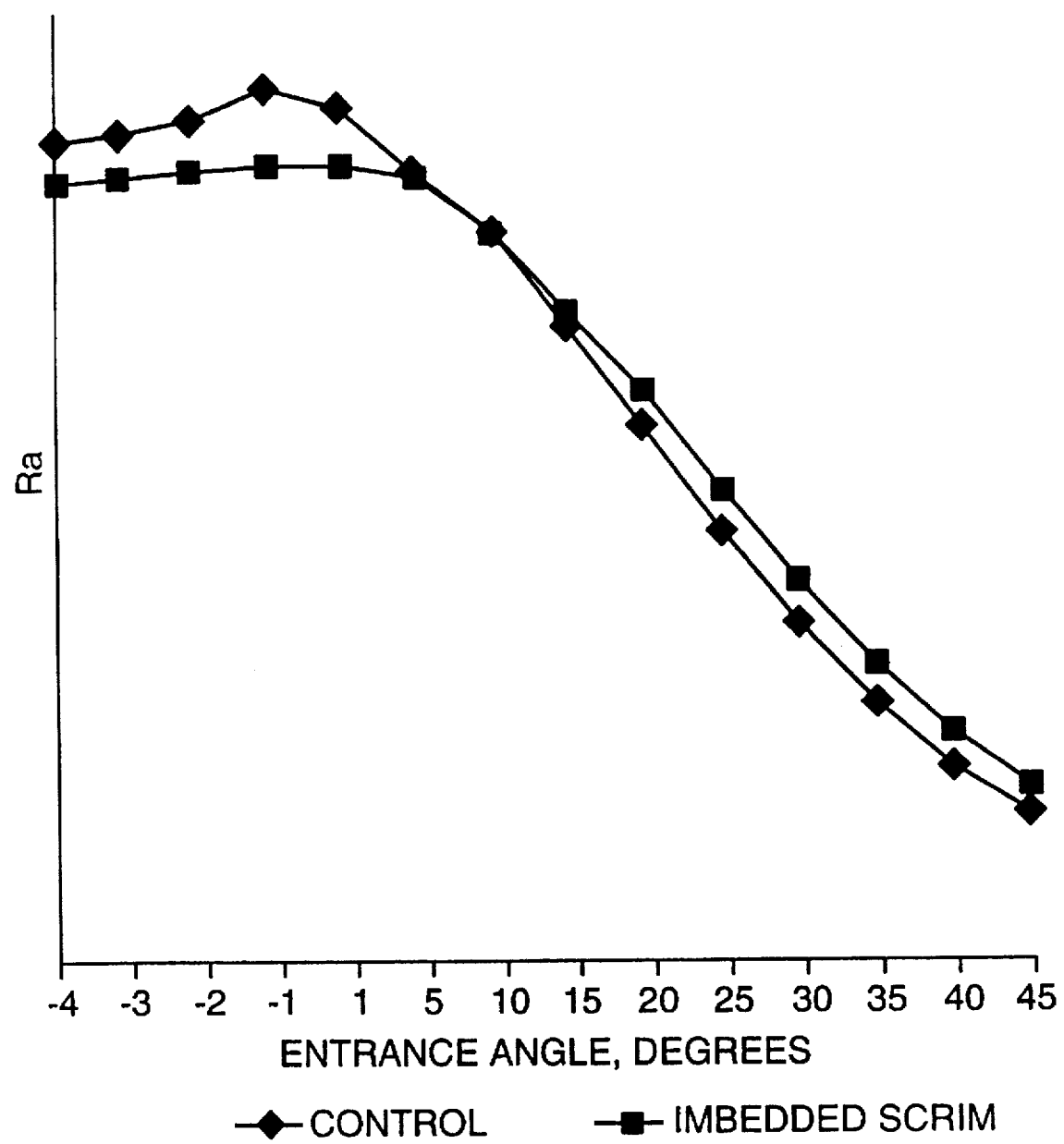
FIG. 26A is a graph of entrance angle versus brightness for various specimens.
Figure 26B:
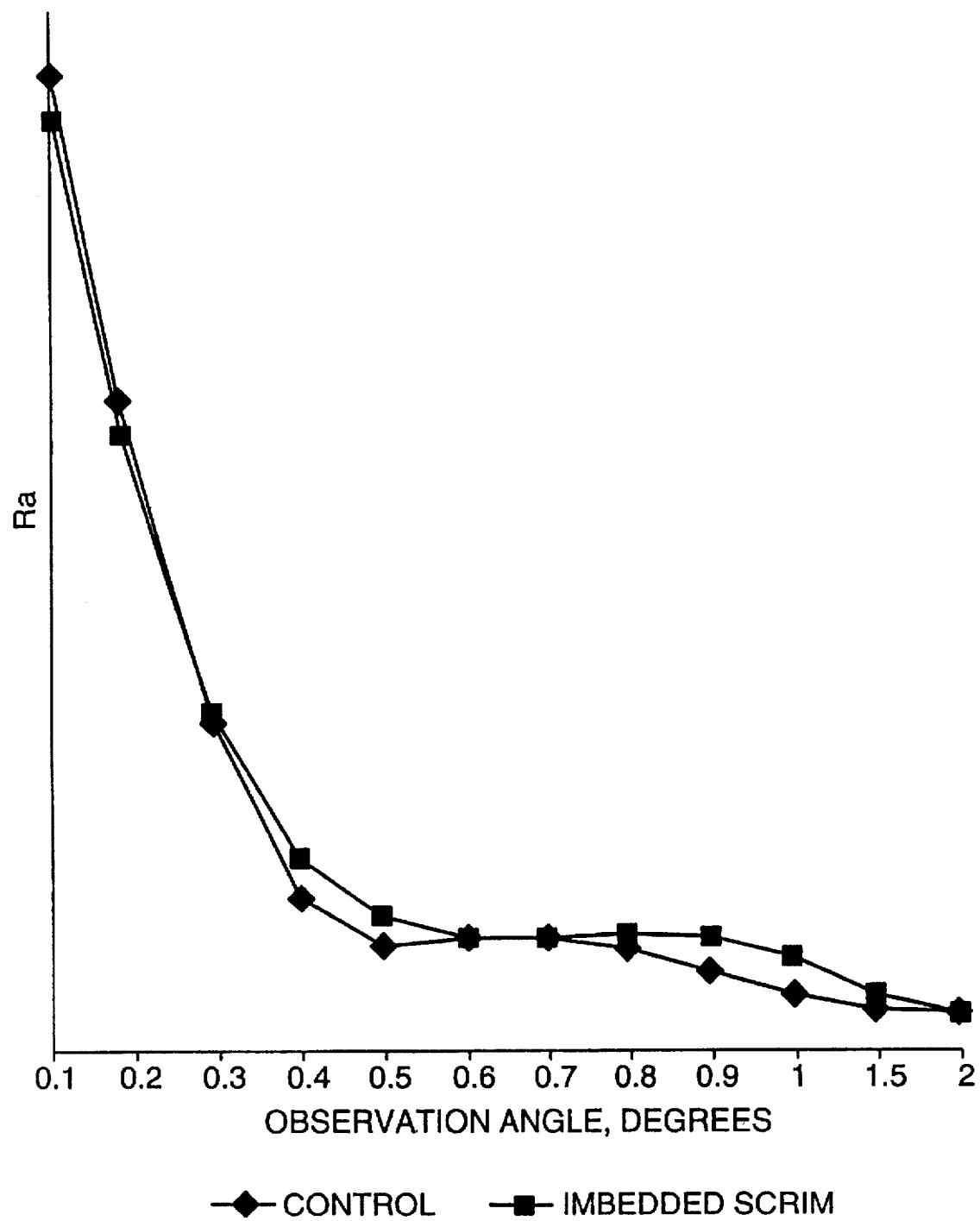
FIG. 26B is a graph of observation angle versus brightness for the specimens of FIG. 26A.

FIG. 26A is a plot of the relative brightness versus entrance angle for the resulting retroreflective articles. FIG. 26B is a plot of the relative brightness versus the observation angle. The control plot is the undeformed retroreflective sheeting.

Example 15

Three samples of the unsealed retroreflective sheeting according to Example 5 with cube-corner elements of different sizes were thermo-formed over a beaded pavement marker available under product designation 5160 Scotchlane™ foil backed tape from Minnesota Mining and Manufacturing Company of St. Paul, Minn. The cube-corner elements were 0.0625 mm (0.0025 inches); 0.086 mm (0.0034 inches) and 0.178 mm (0.007 inches) high, respectively. The greatest glitter-effect was visible on the retroreflective sheeting thermo-formed over the 0.178 mm cubes. The least amount of glitter-effect was visible on the retroreflective sheeting thermo-formed over the 0.0625 cubes.

Example 16

An unsealed retroreflective sheeting according to Example 5 with cube-corner elements 0.086 mm (0.0034 inches) high was metallized by vapor deposition of aluminum metal on the cube-corner elements. The metallized retroreflective sheeting was thermo-formed over the cube-corner side of three commercial reflectors. Reflector A was a 7.62 cm (3 inch) circular reflector divided into 6 pie-shaped wedges of cube corners, sold as Model V472R from Peterson Manufacturing of Grandview, Miss. Reflector B was a 7.62 cm (3 inch) circular reflector having about 20 diamond shaped patterns 1.27×2.54 cm (0.5×1.0 inch) containing cube corner elements, sold as Model Sate-lite-30 from KyKu Products of Bedford Heights, Ohio. The Rectangular reflector 6.35×7.62 cm (2.5×3.0 inches) had vertical rows of cube corner elements offset from each other, sold as Model PEC 4200C from The Refractory of Newburgh, N.Y.

Figure 27A:
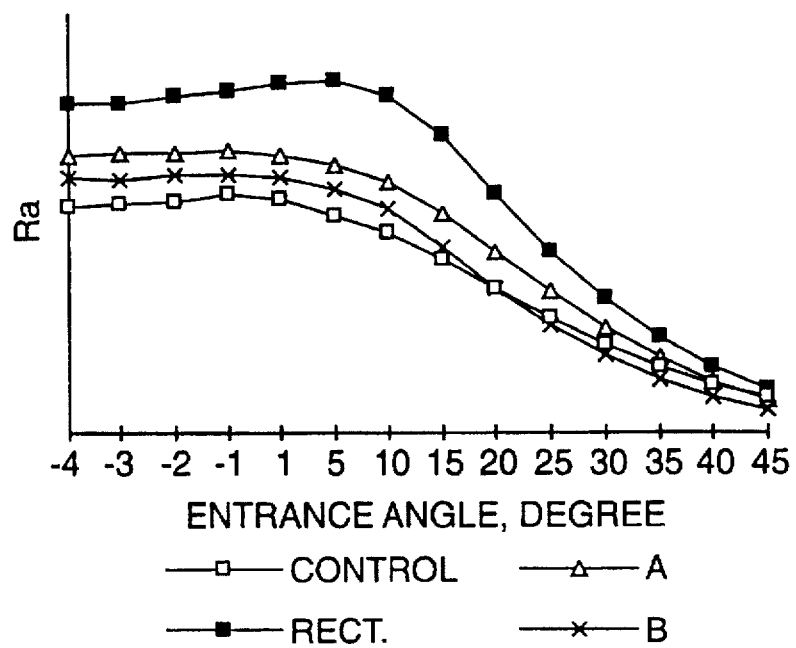
FIG. 27A is a graph of entrance angle versus brightness for various specimens.
Figure 27B:
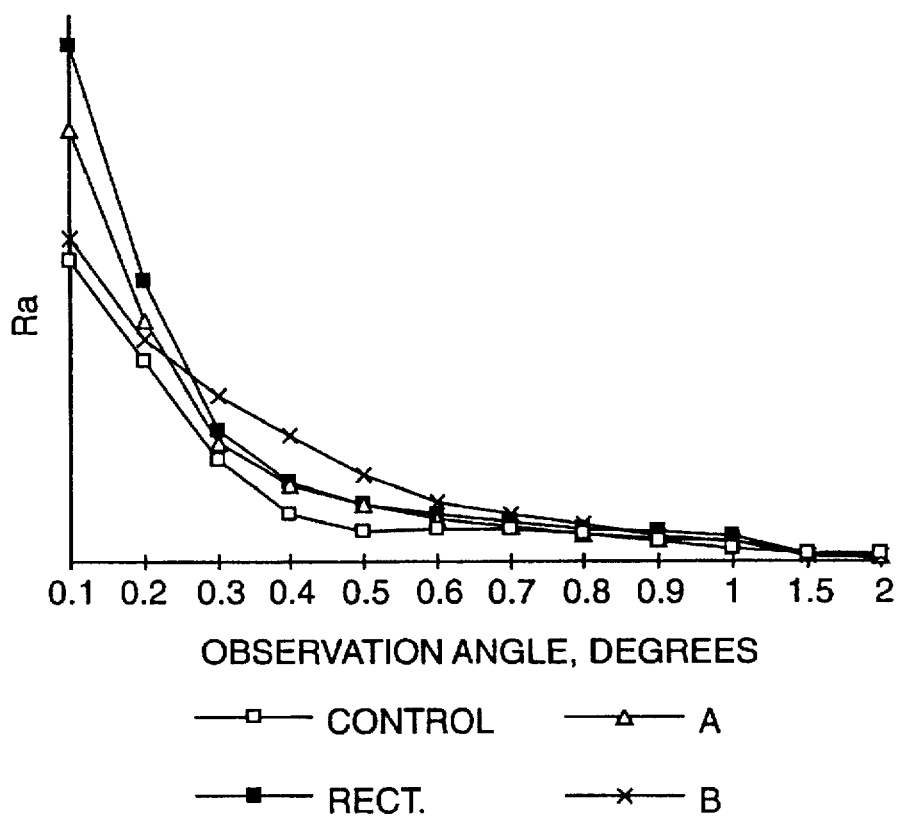
FIG. 27B is a graph of observation angle versus brightness for the specimens of FIG. 27A.
Figure 27C:
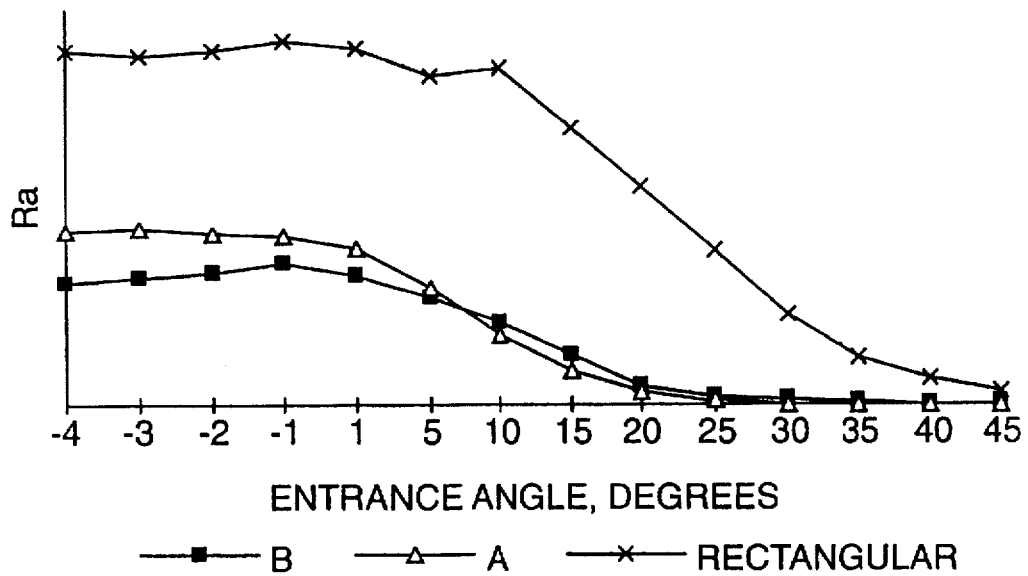
FIG. 27C is a graph of entrance angle versus brightness for various commercial reflectors.
Figure 27D:
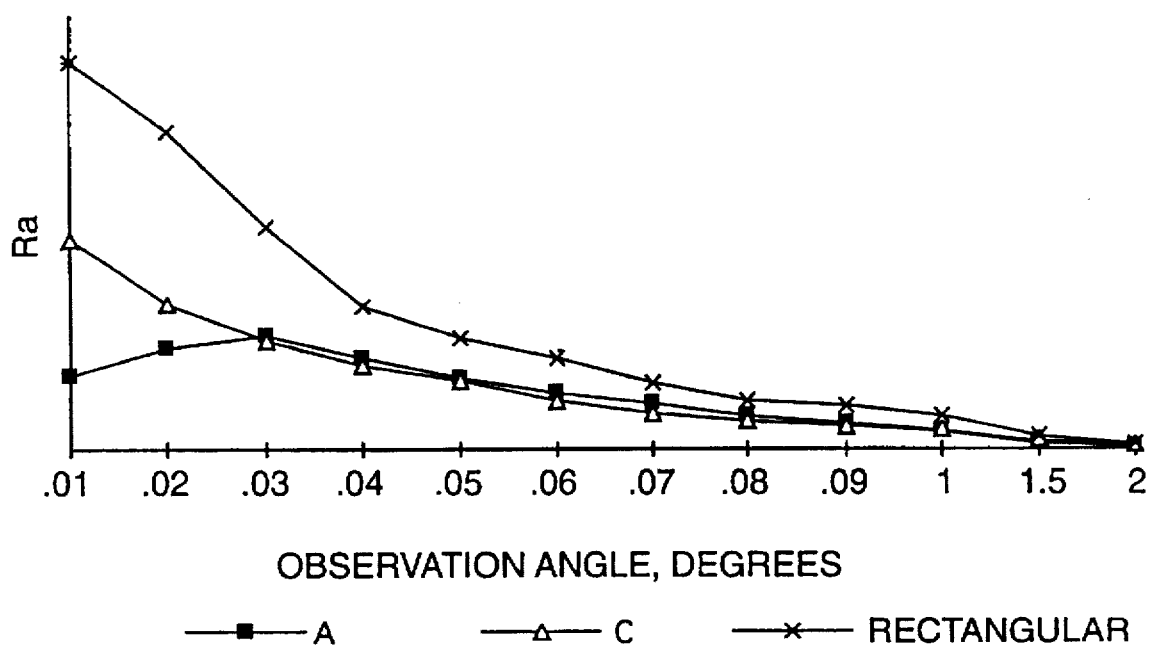
FIG. 27D is a graph of observation angle versus brightness for the commercial reflectors FIG. 27C.

FIG. 27A is a plot of the relative brightness versus entrance angle for the resulting retroreflective articles. FIG. 27B is a plot of the relative brightness versus the observation angle. The control plot is the undeformed metallized retroreflective sheeting. FIGS. 27C is a plot of the relative brightness versus entrance angle for the commercial reflectors illustrated in FIGS. 27A and 27B. FIG. 27D is a plot of the relative brightness versus the observation angle for the commercial reflectors.

All patents and patent applications cited above are incorporated by reference in their entirety into this document.

The present invention has now been described with reference to several embodiments thereof It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

What is claimed is:

1. A retroreflective article comprising a retroreflective sheeting including a multiplicity of discrete, cube-corner elements having base edges, the cube corner elements being cured in situ on a transparent, polymeric overlay film to form an interpenetrating network between a thermoset material of the cube corner elements and the polymeric overlay film, the retroreflective sheeting deformed into a three-dimensional structure so that the base edges of a plurality of cube-corner elements are non-planar with respect to one another located at least two millimeters from a sealing line.

2. The article of claim 1 wherein the retroreflective article produces a target optical profile.

3. The article of claim 2, wherein the target optical profile is glitter.

4. The article of claim 1 wherein the retroreflective article produces a target angularity.

5. The article of claim 1 wherein the retroreflective article comprises a master to produce tooling for forming additional retroreflective articles.

6. The article of claim 1 wherein the base edges of a plurality of adjacent cube-corner elements are non-planar with respect to one another.

7. The article of claim 1 wherein the base edges of a plurality of cube-corner elements are tilted with respect to one another.

8. The article of claim 1 wherein the base edges of one or more cube-corner elements are not parallel to a front surface of the overlay film.

9. The article of claim 1 wherein the cube-corner elements have a variable density across a portion of the retroreflective article.

10. The article of claim 1 wherein adjacent cube-corner elements across a portion of the retroreflective article are variably spaced.

11. The article of claim 1 wherein the overlay film has a thickness that varies across a portion of the retroreflective article.

12. The article of claim 1 wherein the three-dimensional structure comprises one or more embossed symbols.

13. The article of claim 1 wherein the retroreflective sheeting includes a specular reflector coated on the cube-corner elements.

14. The article of claim 13 wherein the cube-corner elements of the retroreflective article are backfilled with a coating.

15. The article of claim 14 wherein the coating contains one or more colors.

16. The article of claim 1 wherein the retroreflective sheeting includes a sealing film extending substantially across the cube-corner elements opposite the overlay film.

17. The article of claim 1 wherein the polymeric overlay film comprises a first elastic modulus and the cube-corner elements comprise a second elastic modulus greater than the first elastic modulus.

18. The article of claim 1 wherein the cube-corner elements comprise a thermoset polymer.

19. The article of claim 1 wherein the polymeric overlay film comprises a thermoformable polymer.

20. The article of claim 1 wherein the overlay film is selected from the group consisting of the following: ionomeric ethylene copolymers, plasticized vinyl halide polymers, acid-functional ethylene copolymers, aliphatic polyurethanes, aromatic polyurethanes, other light transmissive elastomers, and combinations thereof.

21. The article of claim 1 wherein the cube-corner elements comprise a material selected from the group consisting of monofunctional, difunctional, and polyfunctional acrylates.

22. The article of claim 1, wherein the retroreflective sheeting has its cube-corner elements arranged such that an angle α between faces of adjacent cube-corner elements varies therebetween throughout the sheeting to produce a target glitter property.

23. A method of forming a retroreflective article with at least one target optical property, comprising the steps of:

preparing a cube-corner retroreflective sheeting including a multiplicity of discrete, cube-corner elements having base edges, the cube corner elements being cured in situ on a transparent, polymeric overlay film to form an interpenetrating network between a thermoset material of the cube corner elements and the polymeric overlay film; and deforming the flexible retroreflective sheeting into a three-dimensional configuration so that the base edges of a plurality of cube-corner elements are non-planar with respect to one another located at least two millimeters from a sealing line.

24. The method of claim 23 wherein the step of deforming results in the base edges of the plurality of adjacent cube-corner elements to be tilted with respect to one another.

25. The method of claim 23 wherein the step of deforming is selected from the group consisting of thermo-forming, vacuum-forming, embossing, and combinations thereof.

26. The method of claim 23 wherein the step of deforming produces a three-dimensional symbol in the retroreflective sheeting.

27. The method of claim 23 wherein the step of deforming comprises altering the density of at least a portion of the cube-corner elements.

28. The method of claim 23 wherein the step of deforming comprises altering the spacing between at least a portion of the cube-corner elements.

29. The method of claim 23 wherein the step of deforming comprises stretching the retroreflective sheeting in at least one direction.

30. The method of claim 23 wherein the step of deforming comprises altering the base edges of one or more cube-corner elements so that they are not parallel to a front surface of the overlay film.

31. The method of claim 29 wherein the retroreflective sheeting is uniformly stretched.

32. The method of claim 29 wherein the step of stretching comprises bi-axially stretching the retroreflective sheeting.

33. The method of claim 23 further comprising the step of coating the cube-corner elements with a spectral reflector.

34. The method of claim 23 further including the step of bonding a sealing film substantially across an exposed surface of the cube-corner elements.

35. The method of claim 23 wherein the polymeric overlay film comprises a first elastic modulus and the cube-corner elements comprise a second elastic modulus greater than the first elastic modulus.

36. The method of claim 23 further including the steps of:
forming a mold of the cube-corner elements of the deformed retroreflective article;
applying a polymeric material to the mold;
at least partially curing the polymeric material; and
removing the polymeric material from the mold so that a second retroreflective article is produced.

37. A retroreflective article prepared according to the method of claim 23.

38. The article of claim 37, wherein the retroreflective sheeting that is formed as a result of the deformation has the cube-corner elements arranged such that a plane that passes therethrough parallel to the sheeting intersects the cube-corner elements to form triangular cross-sections of varying sizes.

39. The article of claim 16 further comprising at least one sealing line bonding the sealing film to the cube-corner elements.

40. The article of claim 1 wherein the retroreflective sheeting is essentially free of sealing lines.

41. The method of claim 34 wherein the step of bonding the sealing film to the exposed surface of the cube-corner elements comprises the step of forming at least one sealing line.

42. The method of claim 23 wherein the retroreflective sheeting is essentially free of sealing lines.

* * * * *